United States Patent [19]

Kaminsky et al.

[11] Patent Number: 5,675,631
[45] Date of Patent: Oct. 7, 1997

[54] METHODS FOR PROVIDING ENHANCED ADDRESSING CAPABILITY IN VOICE MESSAGING SYSTEM NETWORKS

[75] Inventors: Mark E. Kaminsky, Sunnyvale; Bipin Patel, San Jose; Jeanne Ichnowski, Palo Alto; Roberto Perelman, Sunnyvale; Holly Freeman, Palo Alto; Chris Yuan, Fremont, all of Calif.

[73] Assignee: Siemens Business Communication Systems, Inc., Santa Clara, Calif.

[21] Appl. No.: 62,511

[22] Filed: May 11, 1993

[51] Int. Cl.[6] .................................... H04M 3/50
[52] U.S. Cl. .................. 379/67; 379/89; 379/196; 379/246
[58] Field of Search .................. 379/88, 67, 97, 379/142, 201, 89, 84, 245, 87, 207, 220, 94, 235, 229, 96, 98, 221, 196, 197, 198

[56] References Cited

U.S. PATENT DOCUMENTS

| | | | |
|---|---|---|---|
| 5,195,128 | 3/1993 | Knitl | 379/67 |
| 5,220,596 | 6/1993 | Patel | 379/94 |
| 5,243,643 | 9/1993 | Sattar et al. | 379/88 |
| 5,274,696 | 12/1993 | Perelman | 379/235 |
| 5,287,498 | 2/1994 | Perelman et al. | 379/89 |

*Primary Examiner*—Krista M. Zele
*Assistant Examiner*—Scott Wolinsky

[57] ABSTRACT

Methods are set forth which enable users of a voice messaging system network which supports the Audio Messaging Interchange Specification (AMIS) Analog Protocol to define numbering plans which shorten and simplify addressing an AMIS message to specific AMIS Sites. These user friendly numbering plans are referred to generally herein as "Enhanced Addressing" schemes. The methods contemplated by the invention also support the construction and utilization of the "System Number", as defined in the AMIS Analog Protocol, particularly in conjunction with performing Enhanced Addressing.

30 Claims, 11 Drawing Sheets

METHODS FOR PROVIDING ENHANCED ADDRESSING CAPABILITY IN VOICE MESSAGING SYSTEM NETWORKS

BACKGROUND OF THE INVENTION

1. Field of the Invention

The invention relates generally to voice messaging ("VM") system networks that support the Audio Messaging Interface Specification (AMIS) Analog Protocol. Such networks enable VM systems manufactured by different vendors to communicate in an open network (sometimes referred to herein as an "open access"), environment. More particularly, the invention relates to methods and apparatus which enable administrators of a network which supports the AMIS Analog Protocol to define numbering plans which shorten and simplify addressing an AMIS message to specific AMIS Sites. These user friendly numbering plans are referred to generally hereinafter as "Enhanced Addressing" schemes. The methods and apparatus contemplated by the invention also support the construction and utilization of the "System Number", as defined in the AMIS Analog Protocol, particularly in conjunction with performing Enhanced Addressing.

2. Definitions

"Address"—A means by which the system and mailbox of a message originator and recipient are identified using the AMIS Analog Protocol. The form of the input from the originator identifying the intended recipient is locally defined with the address having two parts: a System Number and a Mailbox ID.

"Administrator"—A person responsible for the administration and management of a voice messaging system.

"AMIS"—Audio Message Interchange Specification—A specification of the interaction between two systems for the purposes of exchanging voice messages. Unless otherwise indicated, it is used herein to reference the AMIS Analog Protocol described in the publication entitled "Audio Messaging Interchange Specification (AMIS)—Analog Protocol", Version 1, Issue 2, published in February, 1992, by the Information Industry Association, Washington, D.C., which is hereby incorporated by reference.

"AMIS Analog Networking"—A networking scheme in which voice messages are transmitted in analog form between two systems and which involves the use of analog (DTMF) signals to convey protocol information. Messages and data are sent over switched or dedicated telephone lines.

"Casual Address"—A site address plus user sub-address for interfacing with the network in an AMIS protocol voice messaging system and accessing the remote site and sub-address at that site.

"Dedicated Circuit"—A circuit, most often provided by a common carrier, which is used solely by the purchaser in the AMIS context, for the purpose of providing a transmission path between two VM systems. Such circuits are also called "TIE" lines.

"Destination System"—A system to which a message or control information is being sent.

"Dial-Out Port"—An analog output channel over which outbound AMIS Analog messages are sent. The AMIS Analog Protocol requires that a system have at least one such port.

"Dial-Up Port"—An analog input channel over which inbound AMIS Analog messages are received. AMIS specifies that a system must have at least one such port. It need not be dedicated to AMIS; it may also be used as the dial-out port (channel).

"DTMF"—Dual Tone Multi-Frequency. The method of signalling in which each digit or symbol is uniquely represented by a standard combination of two tones. Each tone is comprised of two frequencies from one of two exclusive groups. For AMIS, the required tones are 0–9, *, #, C, and D.

"Enhanced Address"—A locally defined address which is shorter than an AMIS address for use with specific AMIS sites.

"Frame"—A unit of information transferred, normally containing data (the message) plus control information in the form of an "envelope" of DTMF tones. There are two basic AMIS frame types, Data and Response, as defined in the publication incorporated by reference.

"International Direct Distance Dialing (IDDD)"—The international form of Direct Distance Dialing. An IDDD number consists in its full form of a Country Code (CC) plus the National Significant Number (NSN). The NSN in turn consists of a trunk code (equivalent to the U.S. Area Code) and Subscriber Number. The maximum length of the CC plus NSN is twelve digits, while that of CC alone is three digits. The IDDD number is the normal way of identifying a "System Number", as defined hereinafter.

"Inter-Vendor Networking"—The mechanisms by which systems produced by different manufacturers network with each other. This is a key objective of the AMIS.

"Mailbox"—A logical abstraction referring to the locations in the system in which a recipient's messages are stored, and which are seen by a recipient as a single logical storage area. Also sometimes referred to herein as a "User Subaddress".

"Mailbox ID"—The portion of an AMIS Analog Protocol address in a message that identifies the mailbox of the originator/recipient, consisting of 1–16 digits.

"Message"—A generic term referring to the audio information sent over a VM system network.

"Open Access"—Refers to the ability of a user on one AMIS system to send messages to a user on another AMIS system, and the recipient user to send a reply back to the originator, without any prearranged configuration of the respective systems, such as the exchange of passwords.

"Originator"—The user who initiates a voice message (also called the Sender). Where necessary, the AMIS Analog Protocol distinguishes between the user and his/her system, referring to the latter as the "Originating" (or Sending) System.

"Port"—The point of access into a system (see also Dial-up Port and Dial-Out Port).

"PSTN"—Abbreviation for the public system telephone network.

"Receive"—One of the basic AMIS Analog Protocol messaging functions. The function by which a destination system accepts a message and stores it in the mailbox of the intended recipient.

"Recipient"—The user who receives a voice message. Where necessary, the AMIS Analog Protocol distinguishes between the recipient and his/her system, referring to the latter as the Destination System.

"Reply"—One of the basic AMIS Analog Protocol messaging functions. The function in which a message recipient may respond to the message.

"Send"—One of the basic AMIS Analog Protocol messaging functions. The function in which a message originator directs the originating system to send a message to a designated recipient.

"Session"—A single connection between voice message systems, during which one or more messages, with accompanying protocol information, are transmitted from the originating system to the receiving (destination) system.

"Subscriber"—Another name for a User with a mailbox on a system.

"System Number"—The portion of an AMIS Analog Protocol address that identifies the originating/destination system. It consists of the International Direct Distance Dialing (IDDD) number by which the system can be reached over the PSTN, with variations to handle special cases such as private network dialing.

"User"—A person utilizing a voice message system; in the AMIS connection, a person who is executing AMIS-visible actions (e.g., Send or Receive) on a message.

3. Description of the Prior Art

Voice messaging ("VM") has become a service that users have come to rely on as a critical communications tool. Voice messaging is an application that allows subscribers to record and distribute voice messages to one or more voice mailboxes for retrieval by the destination party or parties. The user enters the VM system, records a message, specifies message delivery options and recipient addresses based on the available features of the particular VM system, and exits the system. The VM system then delivers the recorded message to the recipients' mailboxes, and in some cases notifies the recipients of the waiting message.

The voice messaging industry has advanced significantly in the last few years. One aspect of that advancement has been the emergence of VM system networking, which extends the voice messaging capabilities beyond the boundary of a single VM system by providing transfer of messages between VM systems. Networking allows an organization to more efficiently and effectively transfer information via voice messaging throughout an organization. For example, VM system networking may link several departments of a large institution, branch offices with corporate headquarters, or small offices in geographically dispersed locations.

Until recently, a given VM system network has involved only systems produced by a single vendor. There is, however, a growing need for the networking of multiple vendors' systems. For instance, as corporations grow though acquisitions, they may find that the companies they have acquired utilize voice messaging systems from different vendors. In other cases, the individual departmental VM system purchases, made before the need for corporate-wide networking was apparent, have led to the purchases of different vendors' systems which must later be made to network. Additionally there is a growing need for corporations to extend their networking boundaries to voice messaging users in other companies. Finally, service providers are also beginning to implement service to individual users that will expect networking with other users in much the same way the public telephone network links them together today.

The Audio Messaging Interchange Specification (AMIS) describes how different vendors' systems can network. Two different AMIS protocols have been developed, responding to a perceived dichotomy in the needs of the voice messaging industry; an AMIS analog networking protocol and an AMIS digital networking protocol.

With a digital scheme, both control signaling and message transmission are done in digital form. To address the needs of small system users and vendors, an alternative analog protocol specification has been developed. The analog protocol, described in the publication previously incorporated herein by reference, uses Dual-Tone, Multifrequency (DTMF) signaling, and message transmission in analog form.

It is in VM networks which support the analog protocol version of the AMIS, that the present invention finds application. Accordingly, the remainder of this background section will focus on the AMIS Analog Protocol per se and desirable features for incorporation in systems supporting the AMIS Analog Protocol.

As indicated hereinabove, the AMIS Analog Protocol provides a mechanism for transferring voice messages among VM systems with similar functions, but different architectures and technologies. It provides defined formats for identifying message originators and recipients, addressing messages, and sending, receiving, and replying to messages. Also, as indicated hereinbefore, signaling is done using DTMF tones, and the actual message is transmitted in analog form.

The primary goal of the AMIS Analog Protocol was to provide open access networking. Open access means that a user on any VM system that supports the specification can send a message to a user on any other VM system that also supports the specification, and the second user can send a reply message to the first user, without prearranged configuration of the respective systems. The AMIS Analog Protocol is therefore designed for use on the public switched telephone network (PSTN), although it may be used, as will be explained hereinafter, with private TIE lines.

Systems may typically access the PSTN via dial-up ports that are addressed using International Direct Distance Dialing (IDDD) telephone numbers (DDD for calls within North America). The use of the established worldwide telephone network ensures universal access.

Another key objective of the AMIS Analog Protocol was to provide a mechanism for meeting the needs of small system users and vendors. Small systems have lower traffic volumes that cannot justify the costs of specialized networking equipment and software. The AMIS Analog Protocol therefore uses analog dual tone multi-frequency (DTMF) control signaling and analog audio message transmission. Since these signaling and transmission capabilities are provided in all common systems, no additional networking equipment is required.

Outside the scope of the AMIS Analog Protocol per se are local system characteristics and requirements which include, for example, user interface characteristics, feature names, local addressing schemes, and other functions that do not require information to be exchanged between systems. A key aspect of the present invention relates to local addressing schemes and related techniques used in systems on a network of VM systems supporting the AMIS Analog Protocol.

Those skilled in the art will readily appreciate that it is common practice to use the facilities of a large network provider to access individual users on a local network accessible to and serviced by the larger network. In this scheme individual users may be addressed by specifying what will be referred to herein as a Casual Address; that is, a Site Address followed by a User Subaddress. The "Site" is a destination on the large network and its address is defined by that network's numbering plan. The "User" is the individual party at the destination, and his address is defined locally.

An example of an environment where Casual addressing may be performed is in a network supporting the AMIS Analog Protocol, since the protocol provides a means whereby users on one voice messaging system may send messages to users on another voice messaging system utilizing the public telephone network (PSTN) or a private telephone network (via TIE lines). Users at the originating AMIS Site address messages by specifying the PSTN or TIE line number (Site Address) of the remote AMIS Site and the mailbox number (User Subaddress) of the destination party.

As indicated in the publication previously incorporated herein by reference, the AMIS Analog Protocol provides for the exchange of originating and destination User Subaddresses as well as identification of the originating system by Site Address.

Using Casual Addressing may mean specifying a large number of digits. This is especially true for networks which support AMIS and utilize the PSTN numbering plan to access AMIS Sites. AMIS protocol requires supporting a 15 digit telephone number and a 16 digit mailbox number. A worst case AMIS Casual Address may thus be 31 digits long. A more typical AMIS Casual Address may be 14 digits: 10 PSTN digits plus 4 mailbox digits. Depending on implementation of Casual Addressing schemes, this does not even include any special access digits required by local dialing plans or any delineators required to separate Site and User addresses. In any case users of such schemes would be required to dial so many digits as to make addressing problematical.

In view of the aforestated addressing problem, it would be desirable to provide methods and apparatus which allow users to specify a locally defined Enhanced Address which may be converted to a Site Address for interfacing with the network and accessing the remote Site, plus a User Subaddress for exchange with the remote Site. That is, it would be desirable to provide methods and apparatus for converting a locally defined Enhanced Address to a Casual Address. As will be demonstrated hereinafter, such methods and apparatus would provide a way to simplify addressing.

Typically, the long string of address digits required to uniquely identify Sites in large networks (such as the PSTN) is not required in configurations which need access to only a few Sites. However, in order to take advantage of access facilities provided by the larger networks, the long string of digits IS required to actually reach the remote Site.

For networks which require a long string of address digits, it would also be desirable to provide methods and apparatus which supports Enhanced Addressing to simplify addressing locally and still be able to access Sites on the larger network by converting a locally defined Enhanced Address to a Casual Address.

In some network access schemes, such as AMIS, the Destination Site is furnished with information identifying the Originating Site and User. This is typically in the form of a Casual Address. In applications which relay this information to the destination party, this may mean providing and storing the problematical long digit string described above.

In such situations, once again, it would be desirable to provide methods and apparatus which support Enhanced Addressing to convert the Casual address supplied to a Destination Site into a simplified local address.

In addition, local addressing plans which use facilities of network providers to access remote Sites, must either conform to the external network addressing plans of the provider or find some means of designating which addressing plan is being used. This becomes more complex when interface is required to more than one network or when special access is required to one network. Access codes prepended to the Site Address are the standard means used to define how subsequent digits are to be interpreted. For example, PBX users typically make external calls by dialing '9' followed by the PSTN number, and private network (TIE line) calls by dialing '8' followed by the TIE line number. Depending on the implementation, sending an AMIS message via the PSTN network may require a special AMIS access code in addition to the PSTN access code.

To simplify addressing in these situations, it would also be desirable to provide methods and apparatus for supporting Enhanced Addressing to define a local addressing scheme which is independent of the external network addresses and does not require the user to dial access codes.

It should be noted that the Enhanced Addressing contemplated by the invention provides a way to uniquely identify remote users. This may be as fine grained as desired. In particular it does not require that every remote user be identified. Enhanced Addressing is strictly a local scheme. Local numbering plans at different Sites are independent.

Those skilled in the art will readily appreciate that one known method for simplifying addressing is to define a private network by describing a numbering plan applicable to all addressable Sites and users within the network. Each user then has a unique address. A range of addresses can be considered to belong to a specific Site and, if that type of numbering plan is designed, translation of digits representing the address range can provide a Site address. In these plans, when the destination is furnished with identifying information about the originator, the address passed is the unique private network address.

However, the major disadvantage of the aforementioned prior art address simplification method is that defining a private network does not address the specific requirements of AMIS; and in fact teaches away from the AMIS premise of supporting open access networking, i.e., it should not be necessary to design special networks in order to use AMIS.

Any Site supporting AMIS and accessible by telephone should be addressable. If using private networks were the only means to conveniently address AMIS Sites, then sending voice messages between Sites which had not previously been networked together might mean defining new addresses for all users.

In addition, the AMIS protocol supplies the Originating Site address (as defined in PSTN or TIE terms) and the User mailbox (as defined by the originating system). In other words, the information supplied by AMIS is not compatible with information required by a private network.

Hence, it would be desirable to provide methods and apparatus that support local addressing schemes compatible with information required during and provided by the AMIS protocol exchange. In particular, it would be desirable if the System Number and Originating Mailbox provided during the AMIS protocol exchange, could be converted to an Enhanced Address using a Site independent locally defined addressing scheme.

It should be noted that the AMIS Analog Protocol, described in the incorporated publication, only defines the format of the System Number; not how the System Number is constructed or used. As a result, it would be desirable to provide methods and apparatus which locally support the construction and efficient utilization of the System Number, particularly (although not necessarily) in conjunction with performing Enhanced Addressing.

In addition, although the AMIS Analog Protocol provides a method by which two different vendors of voice messaging systems can network, those skilled in the art will readily appreciate that several functions, not heretofore supported by commercially available VM system networks, are necessary to properly support AMIS. These include methods and apparatus for:

1. System Number definition and selection;
2. Adjustment of received System Numbers in support of local dialing plans;
3. Encoding AMIS addresses for conserving memory resources and improving data processing efficiency; and
4. Automatically reflecting data base changes for pending calls.

The reasons that the aforestated features are desirable will be elaborated upon immediately hereinafter.

As indicated in the publication incorporated herein by reference, the AMIS Analog Protocol Specification describes call set up, specifies the format for the exchange of call identification information using DTMF tones, and describes the transfer of voice messages. The exchange is designed to take place over the public (PSTN) or a private (TIE) telephone network connecting ports supporting AMIS.

As further taught in the incorporated publication (and indicated hereinbefore), sending AMIS voice messages requires the exchange of call identification information including sending the System Number of the originating system. System Numbers may be either PSTN or TIE lines, and the AMIS Analog Protocol requires that an indication be given as to which is being used by the originating system.

This poses the problem of providing some mechanism for specifying System Numbers and, in a network which supports both PSTN and TIE accesses, of selecting which number to use.

As a result, it would be desirable to provide methods and apparatus which (whether or not Enhanced Addressing is supported), solves the problem of specifying System Numbers and then, in a network which supports both PSTN and TIE access, solves the problem of selecting which number to use.

Furthermore, for the reasons set forth immediately hereinafter, it would be desirable to provide some mechanism for adjusting a received System Number in support of local dialing plans.

Replying to AMIS messages requires "dialing" the System Number. A PSTN System Number is specified in IDDD format which may not be consistent with local dialing patterns. For example, it is permissible for the originating system to transmit the entire IDDD number including the Country Code even if the destination system is in the same local dialing area. In addition, ACCESS CODES which may be required to dial the number are not supplied in the protocol.

Similarly, if calls are returned over a private network, unless the network dialing plan is a uniform dialing plan, ACCESS CODES may be required to route the return call over a tie line. The protocol does not limit the content of TIE line System Numbers so that it would be possible to send an ACCESS CODE along with the TIE line number. This presupposes uniform definitions of ACCESS CODES, which, even in a network managed by a single user, may be problematical.

Replying to an AMIS message therefore poses the problem of adjusting the System Number received to be compatible with local dialing patterns. Accordingly, it would be desirable to provide methods and apparatus which support replying to an AMIS message by adjusting the System Number received to be compatible with local dialing patterns.

A further problem that exists when operating a VM system network that supports the AMIS Analog Protocol is that AMIS destination telephone numbers may, as indicated hereinbefore, be quite lengthy. AMIS addresses consist of the AMIS destination telephone number plus the destination mailbox. A PSTN number may be up to 15 digits long and AMIS supports 16 digit mailboxes. This means addresses of 31 digits are possible—and that does not include any locally required access codes.

In processing messages or in providing access to voice messaging features for AMIS, voice messaging systems have a need to store the AMIS destination address. For example, voice messaging systems generally provide users the capability of creating lists of destinations (Distribution Lists or "DLISTS"), defining a reference number for such a list and then addressing messages to all users on the list by simply addressing the reference number. These lists are usually designed to reflect the length of local mailboxes and therefore may be limited in the number of digits that can be supported. Including AMIS destinations in such lists may be problematical.

Accordingly, it would be desirable to provide methods and apparatus for encoding AMIS addresses to reduce memory usage and improve processing efficiency in VM system networks supporting the AMIS Analog Protocol.

Finally, since ACCESS CODES or System Numbers may be changed, administrative and network management problems may be experienced if such changes are not automatically reflected in local data sets for pending calls. For example, DLISTS may all have to be manually changed if ACCESS CODE data changes. In such circumstances, addressing AMIS messages may have to be suspended until changes are complete. Changes may have to be postponed until pending AMIS messages are delivered, etc.

In view of the aforestated administrative and network management problems, it would be desirable if methods and apparatus were provided which automatically reflected data base changes for pending calls.

SUMMARY OF THE INVENTION

Accordingly, it is a primary object of the invention to provide methods and apparatus which facilitate the performance of Enhanced Addressing on VM networks supporting the AMIS Analog Protocol. Realization of this objective would allow users to specify a simple, locally defined, Enhanced Address which could be converted into a Casual Address (Site Address plus User Subaddress) for interfacing with the network and accessing the remote Site and the subscriber mailbox at that remote Site.

It is a further object of the invention to provide methods and apparatus which reconvert the Casual Address received at a Destination Site into a locally defined (Destination Site) Enhanced Address consistent with the Destination Site's numbering plan.

It is yet another object of the invention, in VM system network configurations which need access only a few Sites but which also want to take advantage of access facilities provided by larger networks, to provide methods and apparatus which support Enhanced Addressing to simplify addressing locally and still be able to access Sites on the larger network by converting a locally defined Enhanced Address to a Casual Address.

A still further object of the invention is to provide methods and apparatus which utilize Enhanced Addressing to define local addressing schemes which are independent of external network addresses and do not require the user to dial access codes.

Yet another object of the invention is to provide methods and apparatus that support local addressing schemes compatible with information required during and provided by the AMIS protocol exchange and which convert the System Number and Originating Mailbox provided during the AMIS protocol exchange, into an Enhanced Address using a Site independent locally defined addressing scheme.

It is a further general object of the invention to provide methods and apparatus for constructing and utilizing System Number information required of and supplied by the AMIS Analog Protocol.

More particularly, it is yet a further object of the invention to provide methods and apparatus which may be used to define System Numbers and, whenever a network supports both PSTN and TIE accesses, select the appropriate System Number to use.

It is a further specific object of the invention to provide methods and apparatus which support replying to an AMIS message by adjusting the System Number received to be compatible with local dialing patterns (whether or not Enhanced Addressing is locally defined at the Destination Site).

A further object of the invention is to provide methods and apparatus which facilitate encoding and compressing System Number address information, and by extension AMIS destination address information, to conserve memory usage and improve processing efficiency in VM system networks supporting the AMIS Analog Protocol.

Finally, it is an object of the invention to provide methods and apparatus which may be used to automatically reflected data base changes for pending calls in a VM system network.

According to one aspect of the invention, a method (and corresponding apparatus), for performing Enhanced Addressing in a VM system network that supports the AMIS Analog Protocol, comprises the steps of:

(a) configuring an Originating Site data base, defining at least the network address of the Originating Site and identifying whether the network address is a PSTN or TIE line number;

(b) defining a Site Profile for each Destination Site to be accessible from the Originating Site utilizing Enhanced Addressing, wherein the Site Profile includes at least the following information:

(b1) a Remote Site Address identifying the Destination Site to be accessed, where the Remote Site Address is defined by the network numbering plan;

(b2) an access code identifying any special access code that needs to be included in addressing the Destination Site;

(b3) access code type information for indicating whether the aforementioned access code is associated with a PSTN number or a TIE line number; and (b4) a set of extension ranges for identifying users at the Destination Site to be accessed, wherein each defined extension range in the set uniquely enables users at the Destination Site to be distinguished from local Originating Site users and from users at any other Destination Sites included as part of the VM network, and further wherein each specific member of an Extension Range is an Enhanced Address; and (c) converting a locally defined Originating Site, Enhanced Address into a Casual Address for interfacing with the network and accessing the Destination Site and subscriber mailbox at the Destination Site.

According to one embodiment of the invention, each extension range in the aforementioned set of extension ranges includes at least the following information:

(a) a Range Length indicating the number of digits in an Enhanced Address associated with a given extension range;

(b) Leading Digits, at the beginning of an Extension Range, which uniquely identify the address as being associated with users at a specific remote Destination Site. These digits need to be unique only within the local system's numbering plan and otherwise may be defined independently at each Site;

(c) an indication of the Number Of Leading Digits associated with each extension range; and (d) an indication of the User Subaddress Length, i.e., the number of digits in the User Subaddress at the Destination Site that a given extension range is designed to address.

According to yet another aspect of the invention, in the context of a network supporting the AMIS Analog Protocol, the aforementioned Remote Site Address is a PSTN or TIE number which may be used to access the remote system's AMIS port.

A still further aspect of the Enhanced Addressing scheme contemplated by the invention is directed to methods (and corresponding apparatus) for converting the address of an Originating Site, provided to the local Destination Site in the form of a Casual Address by the AMIS Analog Protocol, to a locally defined Enhanced Address.

An example of such a method comprises the steps of: (a) converting the Originating Site Casual Address received as protocol data to an Adjusted System Number (where an Adjusted System Number is defined herein as a System Number received at a local Destination Site that is modified to facilitate replying to an AMIS message taking in account local dialing plan constraints); (b) determining if a Site Profile is defined at the local Destination Site containing a Site Address/Adjusted System Number match; and (c) building a local Enhanced Address defined in any such Site Profile whenever a Site Address in the aforementioned profile matches said Adjusted System Number, using a Site independent locally defined addressing scheme.

Yet another aspect of the invention is directed to utilizing Enhanced Addressing to define local addressing schemes which are independent of external network addresses and do not require the user to dial access codes.

Still further aspects of the invention are directed to methods and apparatus which facilitate (for both Enhanced Addressing and Non-Enhanced Addressing purposes):

1. System Number definition and selection;

2. Adjustment of received System Numbers in support of local dialing plans;

3. Encoding AMIS addresses for conserving memory resources and improving data processing efficiency; and 4. Automatically reflecting data base changes for pending calls.

An example of a method which may be used to define System Numbers and, whenever a network supports both PSTN and TIE accesses, select the appropriate System Number to use, comprises the steps of: (a) configuring a data base at the Originating Site, defining at least the network address of the Originating Site, including (a1) Home Country Code, Home Trunk Code and AMIS PSTN Telephone Number whenever use of the PSTN by the Originating Site is supported, and (a2) an AMIS TIE Line Telephone Number whenever use of a TIE line by the Originating Site is supported; (b) determining, when selecting the System Number to send to a Destination Site, if the destination AMIS address dialed by the user is prefaced by a defined External Access Code, signifying the use of the PSTN; (c) selecting as the System Number, whenever the destination AMIS address dialed by the user is prefaced by a defined External Access Code, a PSTN System Number including Home Country Code, Home Trunk Code and AMIS PSTN Telephone Number; (d) determining, when selecting the System Number to send to a Destination Site, if the destination AMIS address dialed by the user is prefaced by a defined TIE Trunk Access Code, signifying the use of a TIE line; (e) selecting as the System Number, whenever the destination AMIS address dialed by the user is prefaced by a defined TIE Access Code, a TIE System Number that includes the AMIS TIE Line Telephone Number and a prefix to the AMIS TIE Line Telephone Number to identify the System Number as a TIE System Number; (f) determining, in the event no Access Codes are defined, if the AMIS PSTN telephone number has been configured in step (a); (g) selecting as the System Number, whenever no Access Codes are defined and the AMIS PSTN Telephone Number has been configured in step (a), a PSTN System Number including Home Country Code, Home Trunk Code and AMIS PSTN Telephone Number; and (h) otherwise selecting as the System Number a TIE System Number including the AMIS TIE Line Telephone Number and a prefix to the AMIS TIE Line Telephone Number to identify the System Number as a TIE System Number.

According to the AMIS Analog Protocol, a PSTN System Number is formatted as follows: <Home Country Code> # <Home Trunk Code> # <AMIS PSTN Telephone Number>, where "#" are DTMF # tones used as delimiters in accordance with AMIS Analog Protocol requirements as set forth in the publication incorporated herein by reference. Furthermore, in accordance with the AMIS Analog Protocol, a TIE System Number has the following format: 0## <AMIS TIE Line Telephone Number>, where the prefix "0##" identifies the number to follow as a AMIS TIE Line Telephone Number.

Methods and apparatus which may be used to adjust received System Numbers, in support of local dialing plans to facilitate replying to an AMIS message, are also contemplated by the invention.

An example of one such method comprises the steps of (a) determining whether the System Number supplied by the AMIS Analog Protocol is a PSTN System Number or a TIE System Number and (b) adjusting the System Number received at the local Destination Site to determine a Return Address that is compatible with local dialing patterns (whether or not Enhanced Addressing is locally defined at the Destination Site), as a function of whether the received System Number is a PSTN System Number or a TIE System Number.

In addition, the invention contemplates methods and apparatus which facilitate compressing/encoding System Number address information, and by extension AMIS destination address information, to conserve memory usage and improve processing efficiency in VM system networks supporting the AMIS Analog Protocol.

An example of a method contemplated by this aspect of the invention (as it pertains to compressing/encoding destination telephone numbers for storage), comprises the steps of: (a) defining compressed Trunk Identifier codes which reflect the type of Access Code(s) dialed (e.g., External Trunk Access Code without an appended International Access Code, an External Trunk Access Code plus an appended International Access Code, etc.); and (b) storing the compressed Trunk Identifier Codes to conserve storage otherwise needed to store dialed Access Codes.

Finally, yet another aspect of the invention is directed to methods and apparatus which may automatically reflect data base changes for pending calls in a VM system network by making use of the aforementioned Trunk Identifier Codes. For example, if a call pending delivery (but before "dialing" the remote destination), has an Access Code changed (for example, from "9", for making a PSTN call, to "7"), in a data base containing relevant configuration data; the defined Trunk Identifier code stored as part of the encoding process referred to hereinabove would still be valid, and the updated Access Code (the "7") would automatically be retrieved from the configuration data when actually needed for dialing.

The invention features methods and apparatus for performing Enhanced Addressing in a VM system network that supports the AMIS Analog Protocol which: (1) allow each Site in a network using Enhanced Addressing to define its numbering plan INDEPENDENTLY of every other Site; (2) use locally defined data to convert an Enhanced Address to a Casual Address and use locally defined data to extract information from an Enhanced Address to provide a System Number to the AMIS protocol; (3) convert an address specified in Casual Address format to Enhanced Address format (combining information supplied during, for example, the AMIS protocol exchange, with locally supplied data to build a local Enhanced Address); (4) provide means to use information furnished during the protocol exchange, together with locally defined data, to distinguish between PSTN and TIE line destinations; and (5) define an addressing scheme which can be used to support both Casual and Enhanced addressing over the same system network.

The invention also features methods and apparatus for (1) performing System Number definition and selection; (2) adjusting received System Numbers in support of local dialing plans; (3) encoding AMIS addresses for conserving memory resources and improving data processing efficiency; and (4) automatically reflecting data base changes for pending calls.

These and other objects, embodiments and features of the present invention and the manner of obtaining them will become apparent to those skilled in the art, and the invention itself will be best understood by reference to the following Detailed Description read in conjunction with the accompanying drawings.

DETAILED DESCRIPTION

The methods and apparatus to be described hereinafter, for realizing the aforestated objectives, will (for the sake of illustration only), be explained in terms associated with sending AMIS messages over voice messaging system networks supporting the AMIS Analog Protocol, via either a PSTN or TIE network. A Site on the network will be referred to herein as an AMIS Site (or simply "Site").

It should be noted from the outset that a Universal Addressing scheme which may be employed in an illustrative voice messaging system network in which the present invention may be practiced, is described in U.S. Pat. No. 5,287,498, assigned to the assignee of the present invention, entitled "Message Transmitting System Wherein Receipient Site is Determined Using Information Concerning the Relationship between the Sender and the Recipient", issued Feb. 15, 1994, which patent hereby incorporated by reference.

For AMIS applications (and any other context within which the present invention may prove useful), each local AMIS Site needs to be configured to provide some general information. It (the local Site, also referred to herein as an Originating Site), needs to define its own network address for transmission to a Destination Site and identify whether this is a PSTN or TIE line number.

The required configuration data (i.e., type of data) is the same independent of the Destination Site being accessed and is referred to herein as the Site Address (i.e., the address of the Originating Site). The AMIS Analog Protocol, as described in the incorporated publication, provides a means to indicate via the data format whether the Site Address is a PSTN or TIE line number.

Before describing the methods and apparatus contemplated by the invention for supporting Enhanced Addressing per se, and prior to describing the various methods and apparatus contemplated by the invention for constructing and using System Numbers, an overview of the basic steps involved in transmitting a message over a voice mail system network, from a user at an Originating Site to a mailbox at a Destination Site, will be described with reference to FIG. 1.

Figure 1:
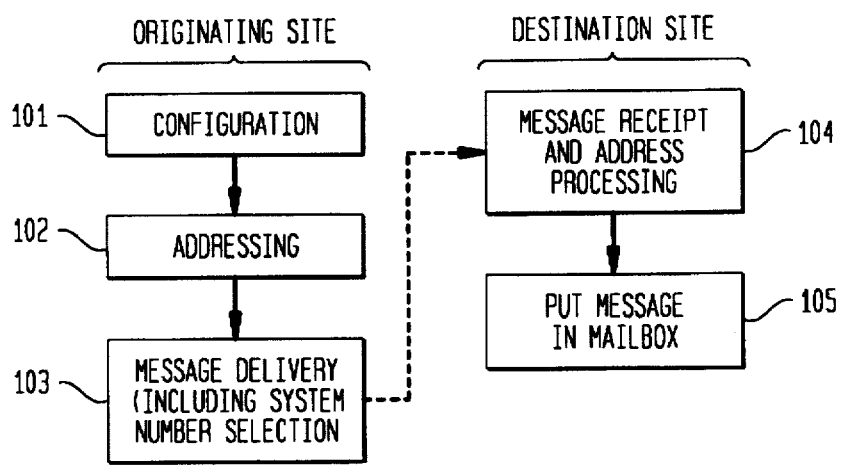
FIG. 1 illustrates, in the form of a block diagram, the basic steps involved in transmitting a message over a voice mail system network from a user at an Originating Site to a mailbox at a Destination Site.

In particular, FIG. 1 illustrates that each Site on the network (presumably all of which have the capacity to be an "Originating Site" for a message), needs to be configured with, at a minimum, the information indicated hereinabove, independent of whether or not the network supports Enhanced Addressing as defined herein. This is shown in FIG. 1 at the block 101 labeled "Configuration".

An exemplary process for performing the configuaration step to supply the address of the Originating Site and an indication of whether the Site Address is a PSTN or TIE line number will be described hereinafter with reference to FIG. 2.

In addition, an exemplary process for configuring each local Site data base with Site Profile data that pertains to each Destination Site accessible from a given Originating Site (utilizing Enhanced Addressing), will be explained hereinafter with reference to FIG. 3.

Figure 2:
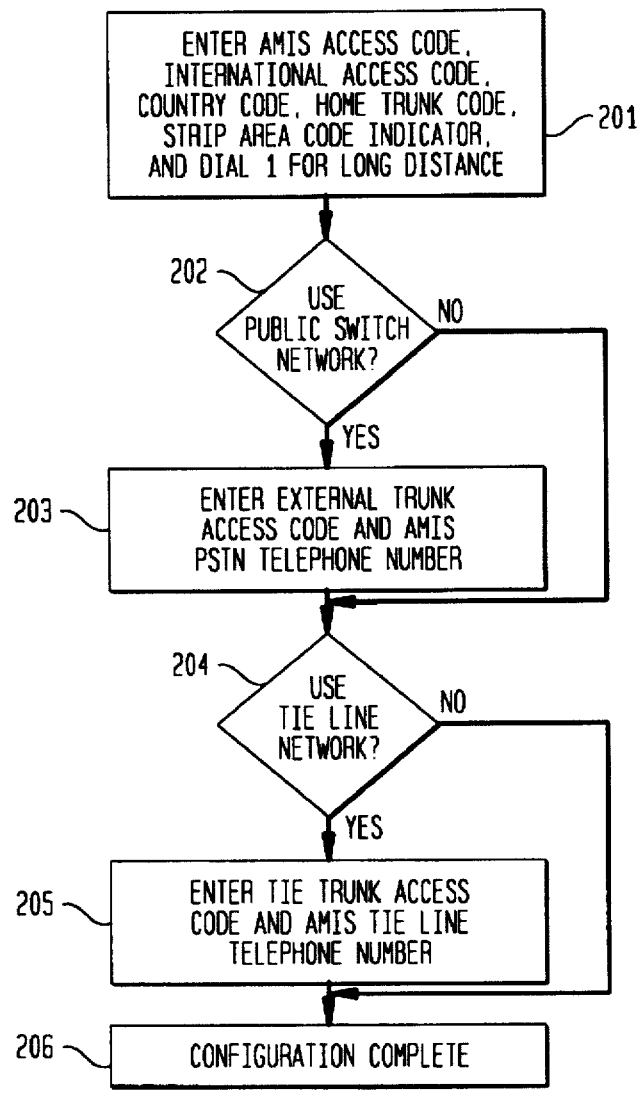
FIG. 2 illustrates, in the form of a flow chart, an example of a process which, according to one aspect of the invention, may be used to configure each system, in a VM system network that supports the AMIS Analog Protocol, with local Site information which enables subscribers to use the network.
Figure 3:
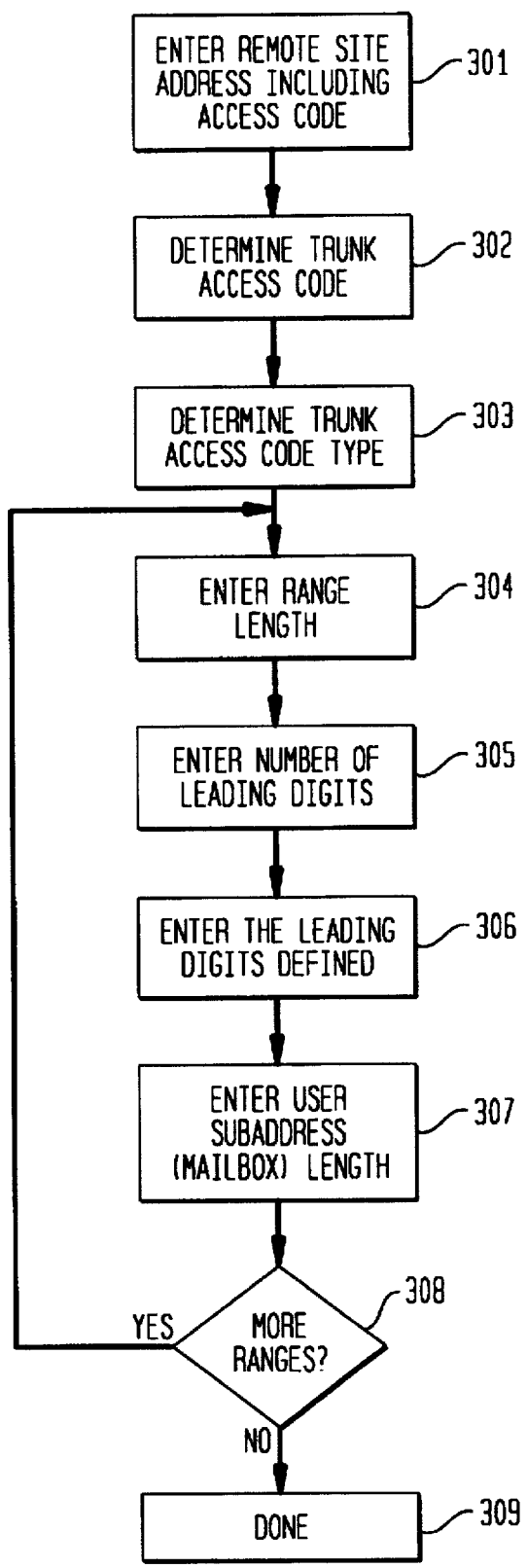
FIG. 3 illustrates, in the form of a flow chart, an exemplary process which, according to a further aspect of the invention, may be used to configure AMIS Analog Site Profiles being defined at a given Site on a VM system network to support an Enhanced Addressing capability as defined herein.

It should be noted that, in accordance with the teachings of the invention, the illustrative processes to be described with reference to FIG. 2 and FIG. 3, are both intended to take place as part of the configuration step shown at block 101 in FIG. 1, in VM system networks that support the AMIS Analog Protocol and Enhanced Addressing.

Block 102 in FIG. 1 illustrates the essential step of "Addressing". That is, a user at the local Site adding an address to a message to target the message to a particular "destination" system and mailbox on the network.

In general, techniques for addressing messages in voice mail systems are well known to those skilled in the art. Sophisticated techniques for performing the addressing function, such as the Universal Addressing scheme set forth in the aforementioned incorporated Patent Application, are also meant to be included among the type of functions represented as being performed at block 102 in FIG. 1.

The Enhanced Addressing techniques taught herein are also, to a large extent, meant to be included among the type of functions represented as being performed at block 102 in FIG. 1. Exemplary processes which may be used to support this aspect of the invention will be described hereinafter with reference to FIGS. 4 and 5.

It should be noted, however, that techniques for supporting Enhanced Addressing as contemplated by a preferred embodiment of the present invention, are also incorporated into Destination Site processes, such as a process for determining an Adjusted System Number for replying to an AMIS message, a process that supports responding to a message using an Enhanced Address if defined at a Destination Site, etc.. Examples of such processes are described hereinafter with reference to FIGS. 9 and 10, and functionally, such processing takes place in the "Message Receipt/Address Processing" block, block 104 as shown in FIG. 1, following receipt of a message at a Destination Site.

FIG. 1 goes on to illustrate that a message that is properly addressed (independent of whether the VM system network supports Enhanced Addressing), must be delivered from the Originating Site to the Destination Site (indicated as functionally taking place at blocks 103 and 104 of FIG. 1), and after being received, the target user address (mailbox) must be ascertained as part of address processing (shown taking place at block 104 as well), with the message ultimately being delivered to the user's mailbox as shown at block 105.

The message delivery process, shown taking place at block 103, is meant to include (for illustrative purposes), performing the System Number definition and selection functions required in a VM system network that (a) supports the AMIS Analog Protocol, and (b) allows usage of the PSTN and/or TIE lines. An overview of an illustrative process for performing this function is set forth hereinafter with reference to FIG. 6.

The System Number definition and selection processes contemplated by the invention, being performed at block 103 in FIG. 1 in accordance with the illustration being presented herein, are described in greater detail hereinafter with reference to the exemplary method steps depicted in FIGS. 7 and 8.

Figure 7:
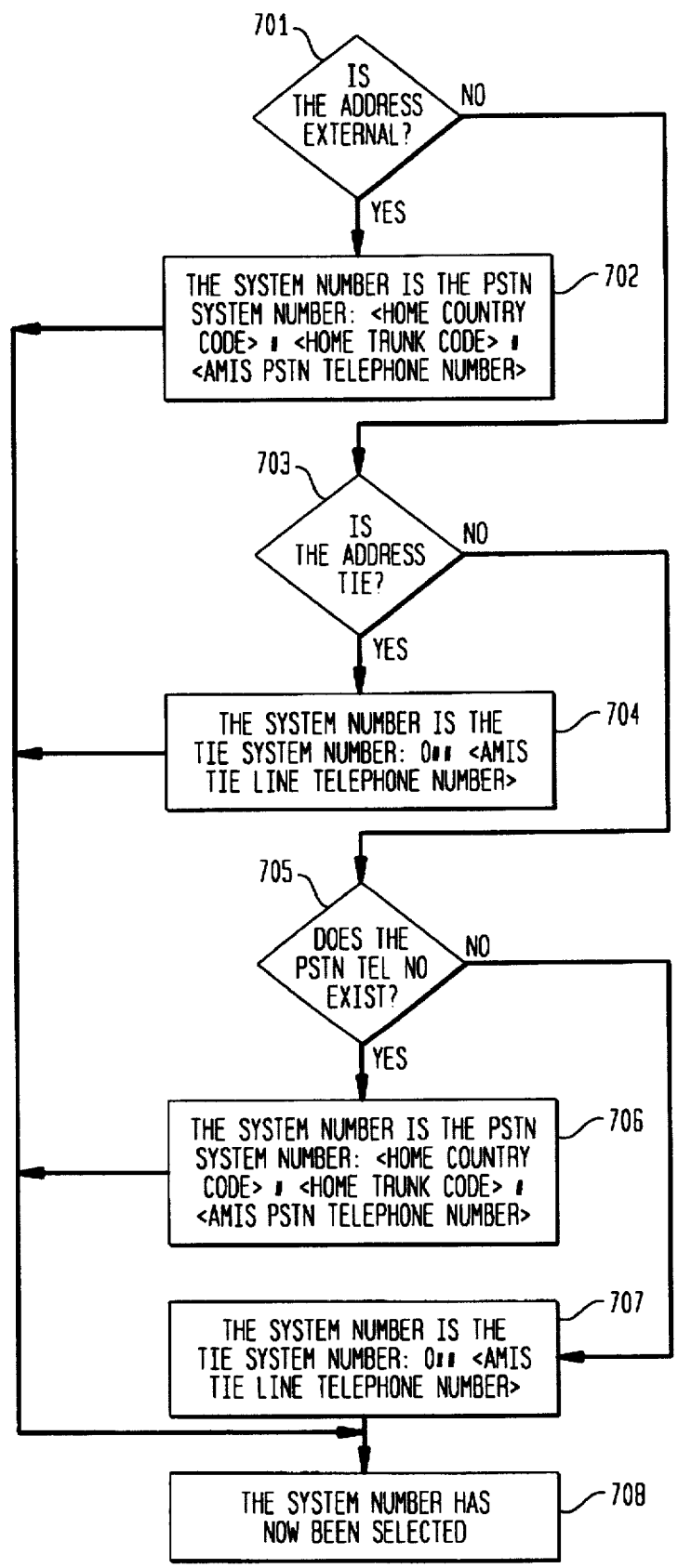
FIG. 7 illustrates, in the form of a flow chart, the details of a first exemplary process for performing System Number definition and selection in accordance with the teachings of the invention.
Figure 8:
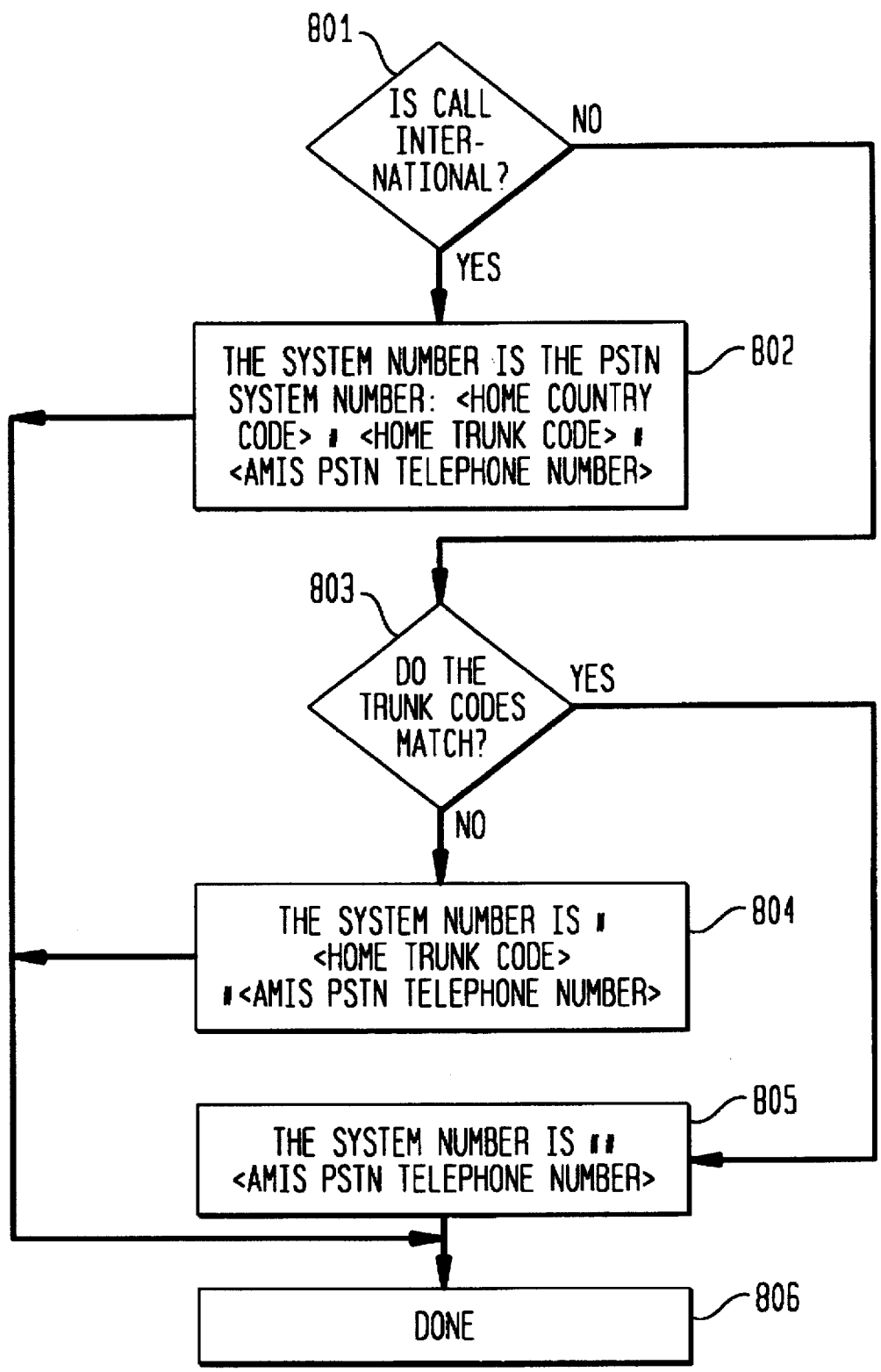
FIG. 8 illustrates, in the form of a flow chart, the details of a second (expanded) exemplary process for performing System Number definition and selection, in accordance with the teachings of the invention.

More particularly, FIG. 7 illustrates the details of a first exemplary process for performing System Number definition and selection in accordance with the teachings of the invention; while FIG. 8 illustrates the details of a second (expanded) exemplary process for performing System Number definition and selection.

Having described, with reference to FIG. 1, an overview of the basic steps involved in transmitting a message over a voice mail system network, the methods and apparatus contemplated by the invention for supporting Enhanced Addressing per se, and for constructing and using System Numbers, will now be described with reference to FIGS. 2-11.

As indicated hereinbefore, each local AMIS Site needs, at a minimum, to define its own network address for transmission to the Destination Site, and identify whether that network address is a PSTN or TIE line number. This definition function is typically performed locally at each system on the network by the System Administrator, a person who is responsible for configuring the local Site data base for a given system.

Those skilled in the art will readily appreciate that although the invention requires that certain information be provided (configured and accessible); it is not relevant to this invention how this information is actually stored or accessed. It is the type of information that is important.

Set forth hereinafter is the type of configuration data that will be necessary to practice all the various aspects of the invention described herein. Subsequent explanations will cover how this information is used by the various processes contemplated by the invention. Those skilled in the art will readily appreciate that only a subset of the configuration data types described hereinafter may actually be "required" to practice a given one of the processes described herein. Nevertheless, a preferred set configuration data includes the following information:

AMIS Access Code: Digits which signal the voice messaging system that the subsequent address digits are for an AMIS destination. The subsequent address digits are used to dial the AMIS destsination for message delivery in a manner well known to those skilled in the art.

International Access Code: Digits which indicate that the following address is an international destination. In the North American dialing plan this is typically 011. The International Access Code must be dialed to reach an international destination over the PSTN.

External Trunk Access Code: Digits which signal that the PSTN network should be used to access the remote destination being addressed. If specified, then the AMIS PSTN Telephone Number (as defined hereinafter) should be defined.

Tie Trunk Access Code: Digits which signal that the TIE line network should be used to access the remote destination being addressed. If specified, then the AMIS Tie Line Telephone Number (as defined hereinafter) should be defined.

Country Code: The digit or digits which identify the country within the international numbering plan in accordance with CCITT recommendation E.163.

Home Trunk Code: The digit or combination of digits which characterize the local called numbering area within a country (or group of countries included in one integrated numbering plan). In the North American Dialing Plan this is the Area Code.

AMIS PSTN Telephone Number: The number to which AMIS messages should be directed by remote systems using the PSTN. In the North American dialing plan this is the IDDD number. For purposes of this invention this number should not include External Access Code, the International Access Code, Country Code or Home Trunk Code.

AMIS Tie Line Telephone Number: The private tie line telephone number to which AMIS messages should be directed by remote systems connected to the network serviced by the tie lines. For purposes of this invention this number should not include the Tie Line Access Code.

Strip Area Code Indicator: A True/False parameter which indicates whether or not the Home Trunk Code is required for dialing local numbers.

Dial 1 for Long Distance: A True/False parameter which indicates whether or not a "1" is required for intra country calls also using a Trunk Code.

It should be noted that either the PSTN or TIE Line Telephone Number must be defined in order to support AMIS as indicated in the incorporated publication directed to the details of the AMIS Analog Protocol per se.

Reference should now be made to FIG. 2 which, as indicated hereinabove, illustrates the steps of an exemplary process which, according to the teachings of the invention, may be used by a System Administrator to configure a given system, in a VM system network that supports the AMIS Analog Protocol, with local Site information enabling subscribers to use the network.

The first step of the illustrative process, indicated at block 201 of FIG. 2, is to input into the local Site data base an indication of (at a minimum) the access codes that may be needed to send a message or to reply to a message sent to the local Site. In particular, block 201 indicates that the System Administrator should input (as part of the Site's network address), the Site's International Access Code, Country Code and Home Trunk Code. In a preferred embodiment of the invention, any defined AMIS Access Code, Strip Area Code Indicator, and Dial 1 For Long Distance parameter, should also be input to the local Site's data base.

Decision blocks 202 and 204 of FIG. 2 indicate that the configuration process contemplated by the invention requires that a determination be made as to whether the PSTN and/or TIE Line network may be used in sending a message or replying to a message sent to the local Site. As indicated hereinabove, it should be noted that the configuration process fails, by definition, if neither the PSTN or TIE line network is allowed.

In the event the originating system wishes the PSTN to be used for receiving replies, a defined External Trunk Access Code, along with the AMIS PSTN Telephone Number, needs to be stored in the local Site data base as shown at block 203 of FIG. 2. In the event the originating system wishes the TIE line network to be used for receiving replies, a defined TIE Trunk Access Code, along with the AMIS TIE Line Telephone Number, needs to be stored in the local Site data base as shown at block 205 of FIG. 2. Block 206 indicates completion of the configuration process. Configuring each local Site data base utilizing the above described process will enable the subscribers to utilize a VM system network that supports the AMIS Analog Protocol, and perform the other processes contemplated by the invention.

In addition to configuring each local Site data base to include the type of information referred to hereinabove, in order to use the Enhanced Addressing features of the present invention, the local AMIS Site must also define a Site Profile for each Site to be accessed (using Enhanced Addressing).

According to a preferred embodiment of the invention, each Site Profile comprises at least the following information:

Remote Site Address: network destination to be accessed where the address is defined by the network numbering plan. For AMIS, this would be the PSTN or TIE number which would access the remote system's AMIS port.

ACCESS CODE: any special access code that needs to be included in addressing the remote destination. In typical PBX configuration, this would be the '9' used for PSTN or '8' used for TIE access. In the case of AMIS, the Access Code, plus the Remote Site Address, would be the number normally dialed to reach the AMIS port.

ACCESS CODE TYPE: indicates whether the access code is associated with a PSTN number or a TIE line number.

An Extension Range or set of extension ranges which identifies users at a Destination Site. The range should be unique enough so as to be able to distinguish those remote users from local users or from users at other Destination Sites. A specific member of an Extension Range is an Enhanced Address. Regardless of the format for specifying Extension Ranges, the following information must be available:

Range Length: the number of digits in an Enhanced Address associated with this range.

Leading Digits: the digits at the beginning of an Extension Range which uniquely identify the address as being associated with users at the remote destination. These digits need to be unique only within the local system's numbering plan. They may be defined independently at each Site.

Number Of Leading Digits.

User Subaddress Length: the number of digits in the User Subaddress at the Destinatioan Site that this extension range is designed to address.

In the commercially available ROLM™ PhoneMail™ VM system (a system in which the Enhanced Addressing features of the present invention may be advantageously utilized), the Extension Range format (recited herein for the sake of illustration), may be specified by:

<Leading Digits>* . . . */<User Subaddress Length> where the Range Length is consistent with the number of Leading Digits plus the number of "*", with each "*" representing any one of the digits 0–9.

It should be noted that Leading Digits are so named because a typical numbering plan designed for Enhanced Addressing is based on prepending digits to User Subaddresses as defined at the Destination Site. The Leading Digits may include no digits, some digits, or all digits from the remote User Subaddress. The digits prepended to a User Subaddress are referred to as Network Prefix Digits.

For example, suppose the remote User Subaddress is 3456. In the PhoneMail implementation, Enhanced Addresses may be any of the following where "X" represents the Network Prefix Digit or Digits (if any at all) and <. . . > encloses the Leading Digits.

< > ****/4

<X> ****/4

<X3> ***/4

<X34> **/4

<X345>/4

<X3456>/4

An example meant to illustrate the possibilities, rather than be an efficient or logical definition for Enhanced Addressing, will now be set forth based on an implementation of Enhanced Addressing that can be realized using PhoneMail.

Assume two Sites, Site A and Site B, on a VM system network supporting the AMIS Analog Protocol, wish to send each other AMIS messages, and that:

(1) for Site A, the AMIS port may be accessed by dialing PSTN number 408-492-1000; and that Site A's mailboxes are 4* and 7*; and (2) for Site B, the AMIS port may be accessed by dialing PSTN number 415-986-2000; and that Site B's mailboxes are 5, 6, and 7*, plus a special mailbox 12345.

At Site A the Site Address would be 408-492-1000 and the profile for Site B may look like:

Remote Site Address: 415-986-2000

ACCESS CODE: 9

ACCESS CODE TYPE: PSTN

Extension Range 1: 25**/3

(This defines Extension Range 2500–2599 and is used to access mailboxes 500–599 at Site B.)

Extension Range 2: 6****/5

(This defines Extension Range 60000–69999 and is used to access mailboxes 60000–69999 at Site B).

Extension Range 3: 8****/4

(This defines Extension Range 80000–89999 and is designed to access mailboxes 7000–7999 at Site B (but in effect will access any 4 digit mailbox at Site B)).

Extension Range 4: 412345/5

(This defines Extension Range 412345 and accesses only one 5 digit mailbox at B: 12345).

At Site B the Site Address would be 415-986-2000 and the profile for Site A may look like:

Remote Site Address: 408-492-1000

ACCESS CODE: 9

ACCESS CODE TYPE: PSTN

Extension Range 1: 34***/4

(This defines Extension Range 34000–34999 and is used to access Mailboxes 4000–4999 at Site A).

Extension Range 2: 27***/4

(This defines Extension Range 27000–27999 and is used to access mailboxes 7000–7999 at Site A).

As defined hereinabove, from Site A's perspective, 4000–4999 and 7000–7999 correspond to Local Mailboxes;

and Enhanced Addresses 2500–2599, 60000–69999, 87000–87999 and 412345, correspond to Mailboxes 500–599, 60000–69999, 7000–7999 and Mailbox 12345, respectively, at Site B.

Except for the necessity of including the User Subaddress ranges in the extension ranges for Site B, the extension ranges defined in the profile for B at Site A are independent of those defined at B. The only constraint is that a unique leading digit needs to be added to distinguish mailboxes which are the same at both Sites. In the example, Site A distinguishes its own 7xxx mailboxes from those at B by addressing those at B as 87xxx.

For the AMIS application the digits comprising the remote User Subaddress portion of the Extension Range must be a legitimate User Subaddress at the Destination Site.

If Site A wishes to use Enhanced Addressing to address another Site, Site C, then it must also define a profile for Site C. If Site B also defines a profile for Site C, it may be completely independent of that defined for C at A, except that all actual User Subaddresses at Site C which are to be addressed at both Site A and Site B must be included in an extension range at each of those sites.

If Site A wishes to use Casual Addressing for some Sites, it may still define and use an AMIS access code as described above to distinguish such addresses by simply being careful in defining ranges to exclude that code.

It should be noted that a Site does not need to define a Site profile for itself; but does need to be configured to include the local Site data discussed hereinabove with reference to FIG. 2.

Before providing specific illustrations of the Enhanced Addressing and System Number related processes contemplated by the invention (to be described with reference to FIGS. 4–10), reference should now be made to FIG. 3. As indicated hereinabove, FIG. 3 illustrates an exemplary process which, according to one aspect of the invention, may be used to configure AMIS Analog Site Profiles being defined to support the subject Enhanced Addressing capability.

In particular FIG. 3 illustrates, for each Destination Site to be addressed utilizing Enhanced Addressing, that the Remote Site Address, including any access code digits, must be entered into the profile at configuration time (as shown at block 301 of FIG. 3). Next, the Access Code and Access Code Type are determined by comparing the initial digits of the Remote Site Address with any preconfigured External Trunk, International, and TIE Trunk access codes, as shown at blocks 302 and 303 of FIG. 3, respectively.

Those skilled in the art will readily appreciate that the steps of determining the Access Code and Access Code Type, as shown at blocks 302 and 303 of FIG. 3, could in an alternate embodiment of the invention, be replaced by the steps of simply entering Access Code and Access Code Type data. As a further alternative, a compressed code representative of Access Code and Access Code Type, as will be explained hereinafter, could be entered.

The exemplary Site Profile configuration process contemplated by the invention is also shown, in FIG. 3, to include the steps of entering, for each Extension Range, the defined Range Length, Number Of Leading Digits, the Leading Digits defined, and User Subaddress (Mailbox) Length. These steps are illustrated at blocks 304–307, respectively, of FIG. 3.

Finally, the illustrative process depicted in FIG. 3 performs a test to see if any further ranges need to be configured for a given Site Profile, reiterating steps 304–307 if necessary, otherwise exiting the configuration process for the Site Profile being constructed, as shown at blocks 308 and 309 of FIG. 3, respectively.

Figure 4:
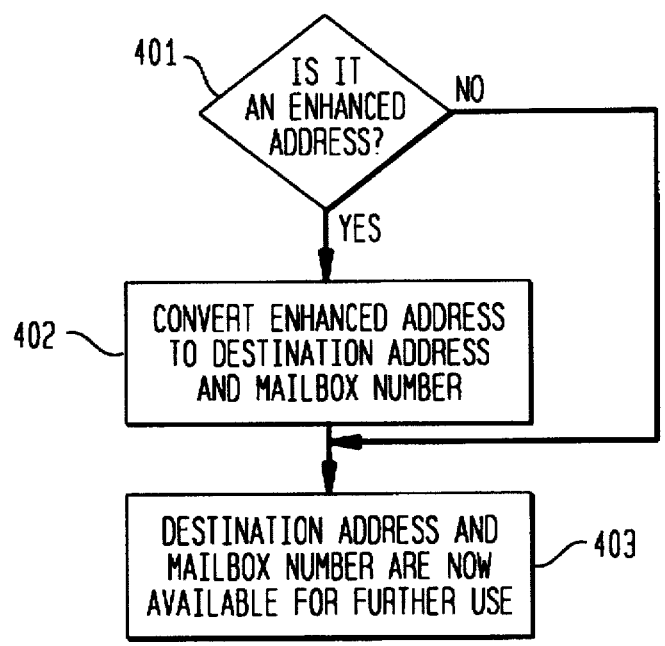
FIG. 4 illustrates, in the form of a flow chart, an overview of an exemplary process for determining whether the user at a given Site on a VM system network is dialing an Enhanced Address, and for converting an Enhanced Address to a Casual Address whenever a defined Enhanced Address is in fact being dialed.
Figure 5:
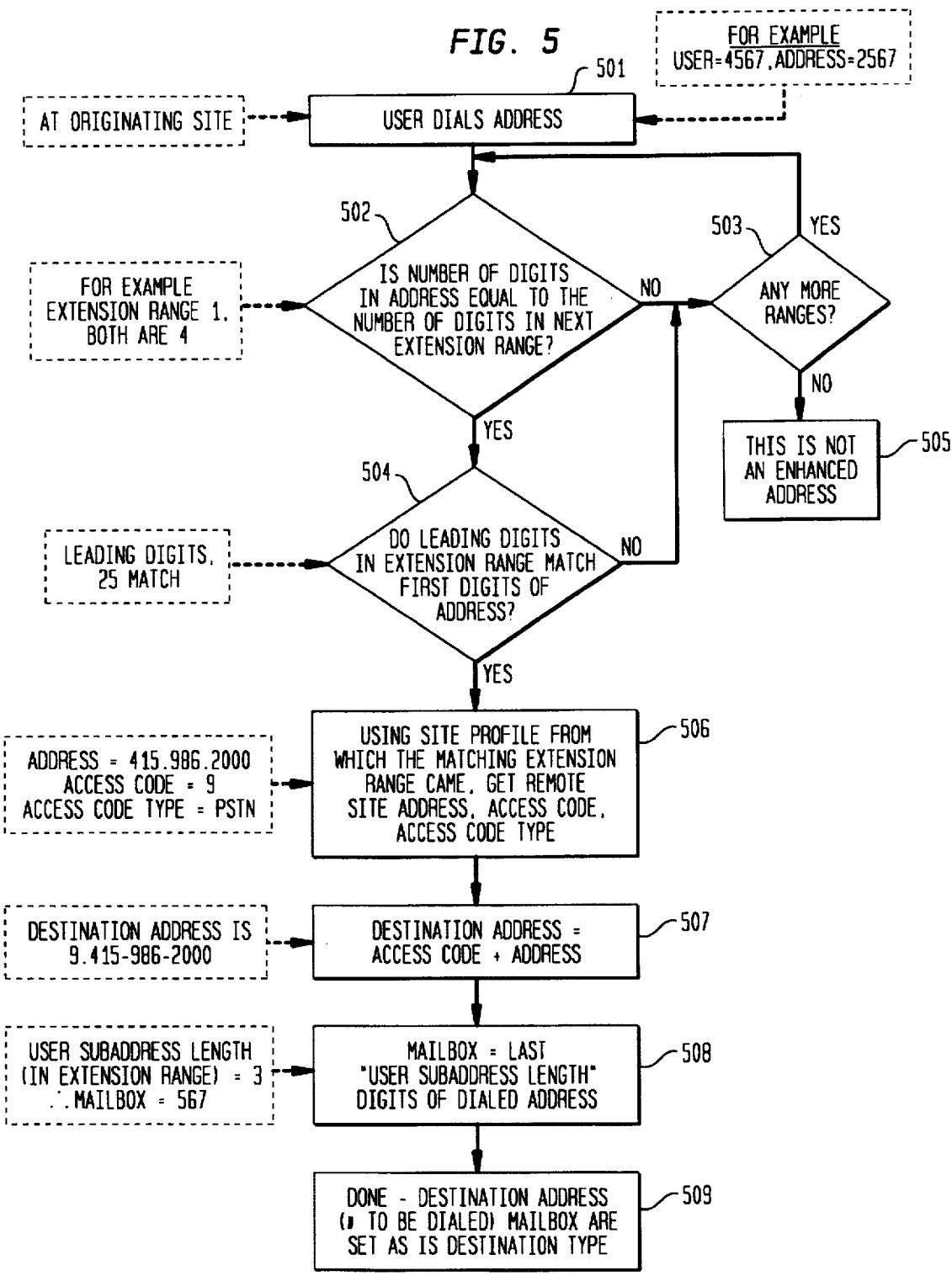
FIG. 5 illustrates the details of an exemplary process for performing the aforementioned conversion of an Enhanced Address into a Casual Address, i.e., for performing the Enhanced Addressing process per se as contemplated by one aspect of the invention.
Figure 9A:
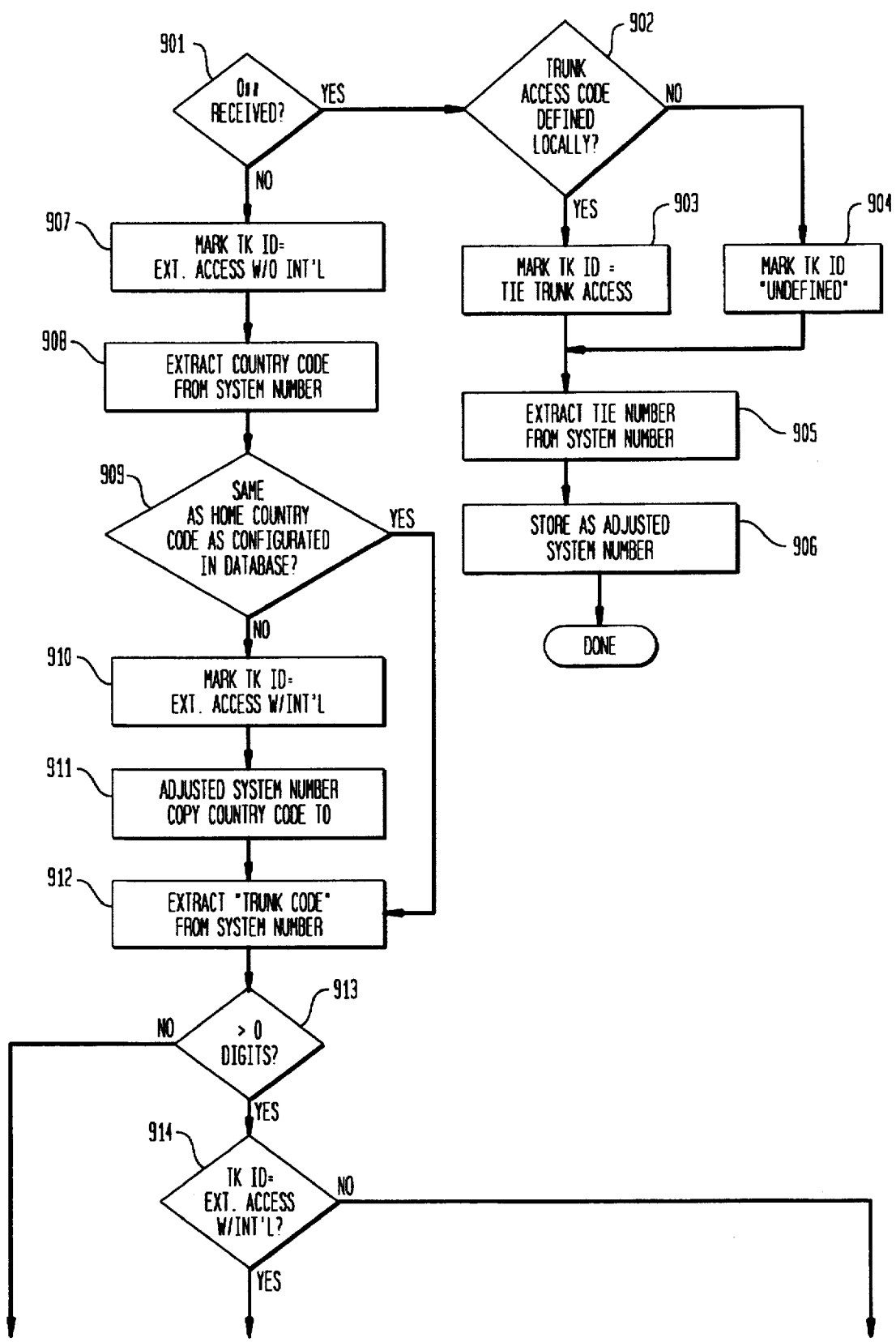
FIG. 9 depicts, in the form of a flow chart, an exemplary process for determining an Adjusted System Number at a Destination Site on a VM system network that supports the AMIS Analog Protocol, to facilitate (taking in account local dialing plans) replying to an AMIS message. This exemplary process includes the utilization of an encoding/compression scheme contemplated by a further aspect of the invention, which may be used to conserve network storage requirements.
Figure 9B:
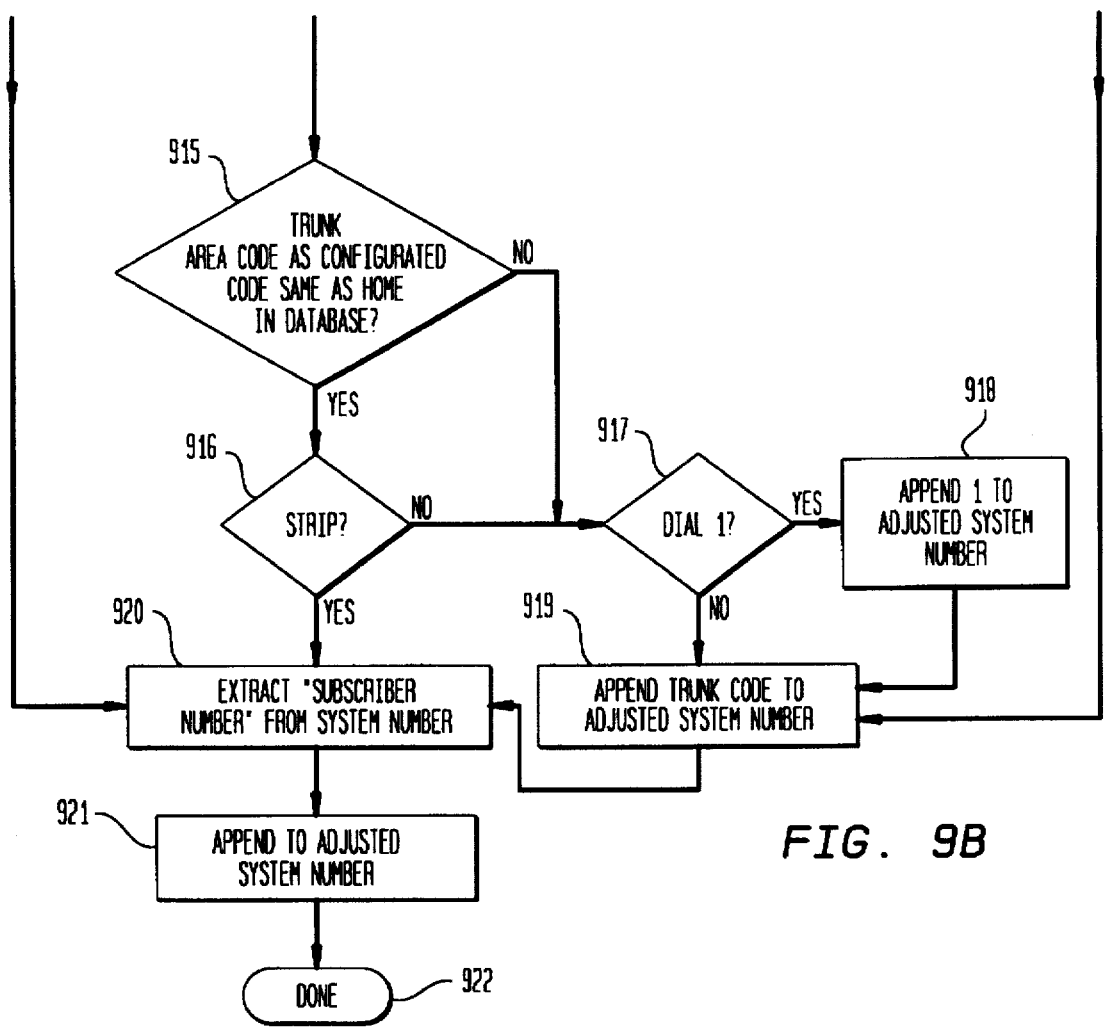
Figure 9:
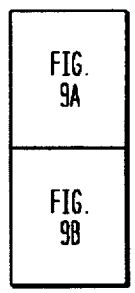
Figures 10, 10A:
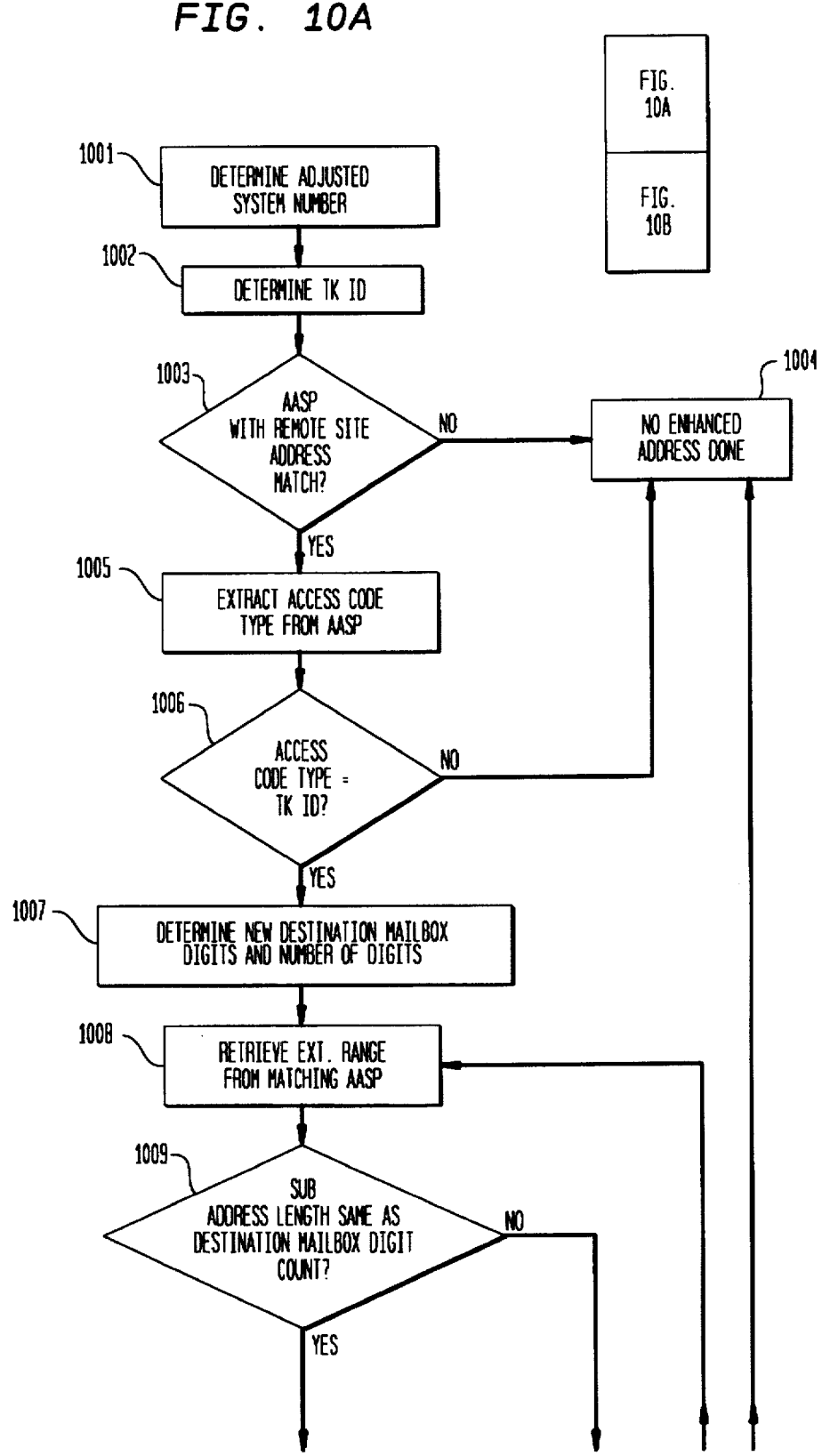
FIG. 10 illustrates, in the form of a flow chart, an exemplary process for converting an Adjusted System Number, constructed at a Destination Site, into an Enhanced Address if locally defined at the Destination Site.
Figure 10B:
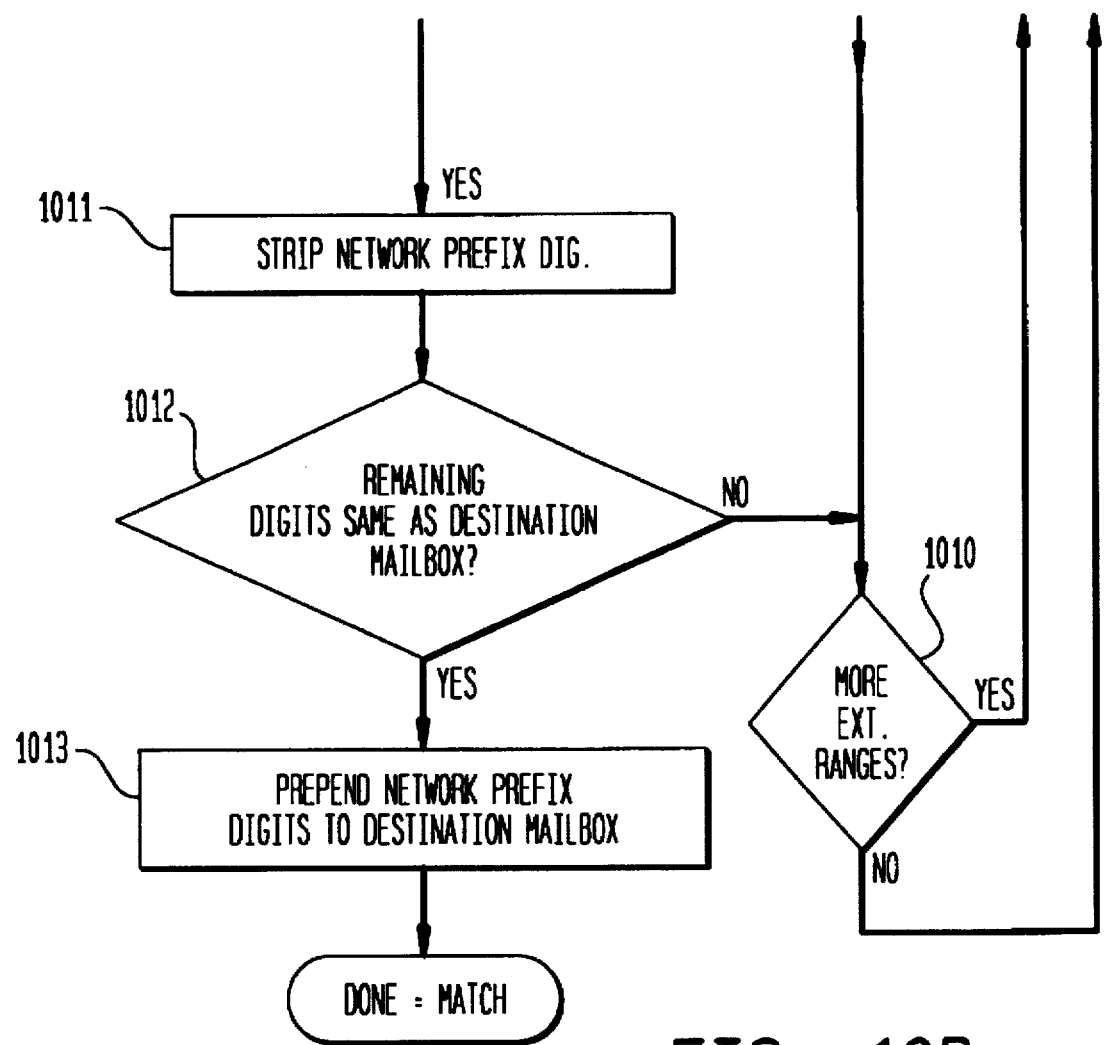

Before reviewing the set of illustrative processes which may be utilized to implement Enhanced Addressing as contemplated by the invention (processes depicted in FIGS. 4, 5, and 10, along with the supporting System Number determination, selection and adjustment processes (further aspects of the present invention in their own right), depicted in FIGS. 6–9), a specific example, using the aforementioned Site Profiles, will now be set forth to illustrate how Enhanced Addressing may be used to send a message from mailbox 4567 (at Site A), to mailbox 567 (at Site B). This example, set forth immediately hereinafter, will demonstrate the principals of Enhanced Addressing as contemplated by the invention and includes the following 8 steps:

(1) At the Originating Site a user addressing an AMIS message to a Destination Site dials an address. For the illustrative example being set forth, user 4567 dials 2567.

(2) At the Originating Site the address dialed is checked to see if it falls within defined extension ranges. An Address is considered within an Extension Range if the number of digits dialed is the same as the Range Length, and all the Leading Digits specified for that range are the same as the leading digits dialed. If within range, the address is regarded as an Enhanced Address. For the case of the illustrative example, address 2567 would be within range 2500–2599 assigned to Site B.

(3) The Originating Site accesses the remote AMIS Destination Site by dialing the ACCESS CODE followed by the Remote Site Address as defined in the profile associated with the matching extension range for the Destination Site. Thus, for the illustrative example, Site A dials 9-415-986-2000.

(4) As part of the AMIS protocol the Originating Site transmits its Site Address and identifies whether the address is PSTN or TIE. Thus, for the illustrative example, Site A transmits 408-492-1000 indicating PSTN.

(5) The Originating Site extracts the Remote User Subaddress from the Enhanced Address for transmission during the AMIS protocol exchange as the destination mailbox by stripping off the Network Prefix Digits. In the example, 567 is sent as the destination mailbox. A suitable set of method steps for determining the Remote User Subaddress is as follows:

(a) Subtract the User Subaddress Length from the Range Length. (This is the number of Network Prefix Digits).

(b) Strip off that many digits from the Enhanced Address starting with the first digit. The remaining digits are the User Subaddress.

Note that it is possible to strip no digits and transmit the entire Enhanced Address. (This may be reasonable in a unified private network numbering plan.) Theoretically, it is also possible to strip all digits (that is, the User Subaddress Length=0), however, the AMIS protocol does not support this.

(6) As part of the AMIS protocol, the Originating Site transmits the locally defined User Subaddress of the message originator. In the case of the illustrative example, Site A transmits 4567.

(7) At the Destination Site, the Site Address received is converted to an Adjusted System Number (as defined hereinbefore), and then checked for a match with Remote Site ADDRESSes defined in local profiles. If the Site Address received is the same as a Remote Site Address and the associated ACCESS CODE TYPE is consistent with the format indicated in the protocol, the profile is considered a matching profile. In the example, PSTN number 408-492-1000 matches that defined in the profile for Site A, whose access code type indicates PSTN.

(8) If a match is found, conversion is possible and the Destination Site uses the originating mailbox received to build a local Enhanced Address from Extension Ranges associated with the matching profile. In our example, Site B would use the Site Address received (408-492-1000) to locate the profile for Site A and build local Enhanced Address 34567.

A suitable (re) conversion process that may be used, in accordance with the teachings of the invention, by the receiving Site is as follows:

(a) In the Site Profile with the matching Site Address consider only those Extension Ranges whose User Subaddress Length is the same as the originating mailbox length.

(b) For potential Extension Range candidates strip the Network Prefix Digits. An Extension Range is considered a match if all remaining Leading Digits are the same as the corresponding digits of the received User Subaddress (in the aforementioned PhoneMail implementation of Enhanced Addressing, the Extension Range digits, formatted as described above and starting with the first past the Network Prefix Digits, are compared one by one to the originating mailbox digits received, until a * is encountered or until a mismatch is found.)

(c) Prepend the Network Prefix Digits of the matching Extension Range to the received User Subaddress. This is the (re) converted Enhanced Address (In the PhoneMail implementation of Enhanced Addressing, each * in the matching Extension Range is replaced by the corresponding digit in the received User Subaddress.)

This completes the illustrative process flow description of how Enhanced Addressing may be performed according to the teachings of the invention.

It should be noted at this point that including the ACCESS CODE TYPE in determining matches (at step (7) of the illustrative example set forth hereinabove), means that in a numbering plan which allows PSTN and TIE line numbers to be the same, the ACCESS CODE TYPE can be used to distinguish between the two.

It should also be noted that in commercially available systems, such as PhoneMail, a number of enhanced applications can be designed around Enhanced Addressing using other features of the underlying system. Specifically, in the case of PhoneMail (by way of illustration), by adding an additional field to the Site Profile, a reference to a recorded Site name can be provided. This means, for example, that when a user dials an Enhanced Address the name of the Destination Site can be accessed and played back to the user for confirmation.

Reference should now be made to FIGS. 4 and 5 which depict exemplary processes which may be used to implement the first 6 steps of the illustrative 8 step Enhanced Addressing process described hereinabove. The types of processes depicted in FIGS. 4 and 5 are examples of process used to implement the addressing functions discussed hereinbefore (taking place at a given Originating Site) with reference to block 102 shown in FIG. 1.

An illustrative process for implementing steps 7 and 8 of the exemplary 8 step Enhanced Addressing process described hereinabove (where steps 7 and 8 are performed at a Destination Site as discussed hereinbefore with reference to block 104 in FIG. 1), will be described hereinafter with reference to FIG. 10.

FIG. 4 illustrates, in the form of a flow chart, an overview of an exemplary process for (a) determining whether the user at a given Originating Site on a VM system network is dialing an Enhanced Address, and (b) directing the processing means supporting a given Originating Site to convert an Enhanced Address to a Casual Address whenever a defined Enhanced Address is in fact being dialed.

The exemplary process depicted in FIG. 4 presumes that it is known that the address being dialed is an AMIS address: i.e., that either an AMIS access code was entered followed by the AMIS destination address and the destination mailbox number, or that the address is an Enhanced Address (an extension which is included in an extension defined ay an AMIS Analog Site Profile (AASP)), in which case the AASP contains the destination address.

The exemplary process depicted in FIG. 4 determines if the AMIS address being dialed is an Enhanced Address. Given the assumption that an AMIS address is being dialed, the determination being made at block 401 could be based on whether or not the digits initially dialed constitute a defined AMIS access code.

According to the exemplary process being set forth with reference to FIG. 4, if an AMIS access code has been dialed, the process depicted in FIG. 4 uses the digits following the dialed AMIS access as the destination address and mailbox number, as shown at block 403, for message addressing and delivery purposes (as described hereinbefore with reference to blocks 102 and 103 of FIG. 1).

Alternatively, if an AMIS access code has not been dialed, the presumption is that an Enhanced Address was dialed and, as shown at block 402 of FIG. 4, the Enhanced Address is converted to the destination address and mailbox number using the appropriate AASP defined at the Originating Site. Once the conversion process (an example of which is described hereinafter with reference to FIG. 5), is complete, once again, the destination address and mailbox number may be used for message addressing and delivery purposes, as indicated at block 403.

Reference should now be made to FIG. 5 which illustrates the details of an exemplary process for performing the aforementioned conversion of an Enhanced Address into a Casual Address, i.e., for performing the Enhanced Addressing process per se (the portion performed at each Originating Site that supports Enhanced Addressing when an Enhanced Address is in fact dialed), as contemplated by one aspect of the invention.

The process steps illustrated in FIG. 5 are, for the sake of illustration, tied to the first 6 steps of the illustrative 8 step Enhanced Addressing process described hereinabove.

FIG. 5, at block 501, indicates the process begins by a user dialing what has been determined (by a process like the one described with reference to FIG. 4) to be an Enhanced Address. In accordance with the illustrative example set forth herein, user 4567 dials 2567.

Next, on a Site Profile by Site Profile basis, the loop shown as including blocks 502–504 is entered. Functionally, a test (at block 502) is made to determine if the number of digits in the address dialed is equal to the number of digits in the next Extension Range (in a given Site Profile); If the answer is no, and there are no more ranges to test (as shown being determined at block 503 of FIG. 5, across the set of defined Site Profiles for the Originating Site), then the address dialed is not a valid Enhanced Address (as shown at block 505 of FIG. 5).

If the number of digits in the address dialed does equal the number of digits in the next Extension Range, then a test is shown being made at block 504 of FIG. 5, to determine if the Leading Digits in the Extension Range match the first digits of the dialed address. Block 503 is entered next if the test for a match fails.

However, if the test succeeds, the aforementioned loop is exited and (as shown at block 506), the Site Profile from which the matching Extension Ranges came is used to obtain the Remote Site Address (corresponding to the dialed Enhanced Address), along with the Access Code and Access Code Type parameters described hereinbefore.

In the case of the illustrative example being set forth herein with reference to FIG. 5, the test at block 502 succeeds when, for "Extension Range 1" as previously defined in the Site B profile (defined at Site A), the number of digits dialed (4), equals the number of digits in Extension Range 1. Furthermore, the test at block 504 succeeds when it is determined that the Leading Digits of the dialed address (the digits "25") match the lead digits in Extension Range 1.

Still further, in the case of the illustrative example being set forth herein with reference to FIG. 5, the Remote Site Address is determined to be 415-986-2000; the Access Code is determined to be "9"; and the Access Code Type is determined to be PSTN.

FIG. 5 goes on to illustrate, at block 507, that the destination address is set equal to the Access Code plus Remote Site Address (i.e., 9-415-986-2000 for the example); and (at block 508), that the destination mailbox equals the last "User Subaddress length" digits of the dialed address (the last 3 digits of the dialed address in the illustrative example are "567").

Finally, FIG. 5 illustrates that the conversion process is complete (block 509) with the destination address (number to be dialed) and destination mailbox number having been determined, along with destination type (PSTN or TIE).

The resulting Casual Address and other information obtained during the conversion process, may be used to provide the information required by the AMIS Analog Protocol (as described hereinbefore with reference to the protocol per se and with reference to illustrative steps 1-6 set forth hereinabove).

Before turning to FIG. 10 and a description of an illustrative process for supporting steps 7 and 8 of the exemplary 8 step Enhanced Addressing process described hereinabove, reference should be made to FIGS. 6-9 which illustrate the supporting System Number determination, selection and adjustment processes contemplated by the invention. It should be noted that these process may be advantageously used in VM system networks that support the AMIS Analog Protocol, independent of whether the system network supports Enhanced Addressing.

It should be recalled that the message delivery process, shown taking place at block 103 of FIG. 1, is meant to include (for illustrative purposes), performing the System Number definition and selection functions required in a VM system network that (a) supports the AMIS Analog Protocol, and (b) allows usage of the PSTN and/or TIE lines. An overview of an illustrative process for performing this function is set depicted in FIG. 6.

Figure 6:
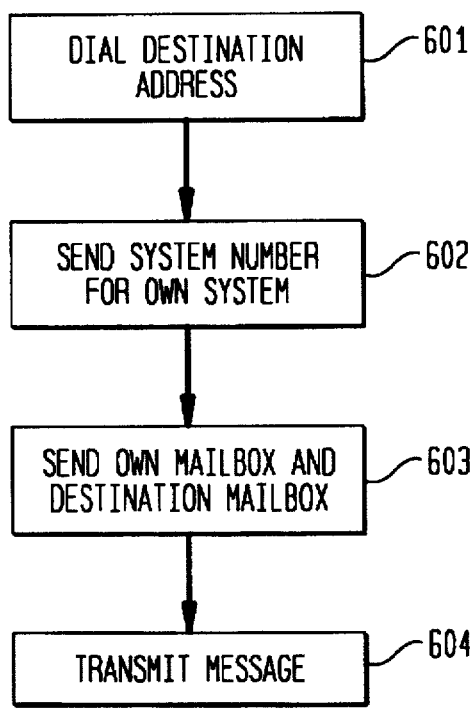
FIG. 6 illustrates, in the form of a flow chart, an overview of an exemplary process for message delivery from an Originating Site to a Destination Site in a VM system network that supports the AMIS Analog Protocol. The illustrative message delivery process includes the step of performing the System Number definition and selection functions required in a VM system network that (a) supports the AMIS Analog Protocol, and (b) allows usage of either the PSTN or TIE lines.

The process depicted in FIG. 6 begins with the destination address being dialed at an Originating Site, as shown at block 601. Following along with the illustrative example set forth hereinbefore, the user at the Originating Site (Site A) would dial 9-415-2000 to send a message to Site B.

Next, the System Number for the originating system is defined, selected and sent, as shown at block 602, in accordance with the requirements of the AMIS Analog Protocol. The protocol specifies that the system number be sent; but does not dictate how to determine what to send as the system number.

Examples of the System Number definition and selection processes contemplated by the invention, shown as being performed (for the sake of illustration) at block 103 in FIG. 1 (and at block 602 in FIG. 6), are described in greater detail hereinafter with reference to the exemplary method steps depicted in FIGS. 7 and 8.

As indicated hereinbefore, FIG. 7 illustrates the details of a first exemplary process for performing System Number definition and selection in accordance with the teachings of the invention; while FIG. 8 illustrates the details of a second (expanded) exemplary process for performing System Number definition and selection.

In the context of the illustrative example (referring to the defined Site Profiles and local data for Sites A and B as defined hereinbefore), the System Number sent would be (in accordance with the AMIS Analog Protocol, where "#" is a DTMF # tone used as a delimiter), 1#408#4921000. This would indicate that the System Number is a PSTN number; that the home country code is 1; the home trunk (area) code is 408; and that the AMIS PSTN Telephone Number is 492-1000.

After the System Number is defined, selected and sent by the Originating Site (as shown taking place at block 602 of FIG. 6), the Originating Site sends its own mailbox (4567) and destination mailbox (567) as required by the AMIS protocol. This is illustrated as taking place at block 603 of FIG. 6. Finally, the message itself is sent to the Destination Site as shown at block 604.

The processes used to support the System Number definition and selection aspects of the invention will now be described with reference to FIGS. 7 and 8.

As discussed hereinabove, whenever a user addresses an AMIS message he must specify the AMIS destination address followed by the mailbox number. For the sake of explaining the present invention, it is assumed the address is specified by the user exactly as if he were to dial it.

For example, for PSTN destinations the address would consist of:

<External Trunk Access Code>

<Country Code> (if international)

<1> (if long distance, but not international and local dialing plans require it)

<Trunk Code> (if long distance, or local but required by the dialing plan)

<Remote Subscriber Telephone Number>

For destinations on a private TIE line network, the address would consist of:

<Tie Trunk Access Code>

<Remote Tie Line Telephone Number>

It is also possible to design numbering plans which access outgoing trunks based on the remote telephone number alone—that is without requiring access codes. In this case the AMIS destination address would be:

<Remote Telephone Number>

The System Number required for use by the AMIS protocol is as follows, where "#" are DTMF # tones used as delimiters:

PSTN Number format:

<Country Code>#<Trunk code>#<Subscriber Number>#

Tie Number format:

0##<Tie Number>#

It should be noted that there are some restrictions on the length of each of the System Number fields specified in the AMIS protocol. However, those considerations are not relevant here.

With the aforestated definitions and considerations in mind, an illustrative process for defining and selecting the System Number is (making reference to FIG. 7):

(a) If the destination AMIS address dialed by the user is prefaced by the defined External Access Code (test being performed at block 701 of FIG. 7); then retrieve, from configured data, the Home Country Code, Home Trunk Code and AMIS PSTN Number and send (as shown in block 702 of FIG. 7), PSTN System Number:

<Home Country Code>#<Home Trunk Code>#<AMIS PSTN Telephone Number>; and (b) If the destination AMIS address dialed by the user is prefaced by the defined TIE Trunk Access Code (test being performed at block 703 of FIG. 7); then retrieve the TIE Line Telephone Number and send (as shown at block 704 of FIG. 7), TIE System Number:

0## <Tie Line Telephone Number>.

In either of the aforementioned cases, (the test at block 701 or 703 being positive), the System Number is defined and selected based on a defined Access Code having been dialed and the process depicted in FIG. 7 concludes at block 708 (System Number selection complete).

If the destination AMIS address is not prefaced by either defined trunk access code, then the illustrative process depicted in FIG. 7 (at block 705) continues by determining if the AMIS PSTN Telephone Number exists Logically, as an alternative, the process could determine if the Tie Line Telephone Number exists.

If the AMIS PSTN Telephone Number has been defined, the process calls for sending the PSTN System Number as described above (as stated in block 706 of FIG. 7). Otherwise, the TIE System Number is sent as shown at block 707 of FIG. 7.

It should be recalled that configuration is incomplete if neither the AMIS PSTN Telephone nor the AMIS TIE Line Telephone Number is defined. Hence the process depicted in FIG. 7 never results in an undefined System Number.

Those skilled in the art will recognize that the AMIS Analog Protocol does not require the Home Country Code or Home Trunk Code, and that whether to send them or not is regarded as a "local system issue". If these fields have not been defined the associated fields in the PSTN System Number above will be blank. Alternatively, using definitions compatible with the country dialing plans the process depicted in FIG. 7 can be expanded as shown in FIG. 8, with the flow chart depicted in FIG. 8 replacing the blocks 702 and 706 of FIG. 7 where the PSTN System Number is used.

The illustrative process depicted in FIG. 8 first determines if the destination AMIS address dialed by the user includes the defined International Access Code (at block 801 of FIG. 8). If the code is not defined, the System Number Home Country Code field is left blank. If the code is defined, the PSTN System Number is defined as shown at block 802 (which is the same number shown at blocks 702 and 706 of FIG. 7).

If the destination AMIS address dialed by the user is not an international call and does NOT include a matching Trunk Code (with the test for matching Trunk Code being made at block 803), then the process depicted in FIG. 8 calls for defining the System Number as shown at block 804 in FIG. 8; otherwise, the System Number is defined as shown in block 805 of FIG. 8.

Once the System Number has been defined and selected, the exemplary process depicted in FIG. 8 terminates at block 806.

Attention will now be turned to an exemplary process for adjusting a received System Number in support of local dialing plans. The process will first be described, followed by an indication of, in accordance with yet another aspect of the invention, how AMIS addresses may be encoded to conserve storage. Following both these descriptions, reference will be made to FIG. 9 for a summary of an exemplary Adjusted System Number determination process which utilizes Trunk Identifier codes (as defined hereinafter), to conserve memory.

An exemplary process for adjusting a received System Number in support of local dialing plans (at destination Sites), in accordance with the teachings of the invention, is as follows:

(a) If a PSTN System Number is received the RETURN Address is composed as follows:

<External Trunk Access Code>: if defined;

<International Access Code>: if a non-blank Country Code is received and it is different from the Home Country Code, (or the Home Country code is undefined);

<Country Code received>: if a non-blank Country Code is received and it is different from the Home Country Code (or the Home Country Code is undefined);

<1>: if all of the following are true:

1) a non-blank Country Code is received and it is the SAME as the Home Country Code, AND 2) a non-blank Trunk Code is received and it is DIFFERENT from the Home Country Code OR it is the same but the Strip Area Code is False, AND 3) if Dial 1 for Long Distance is TRUE;

<Trunk Code Received>: if a non-blank Trunk Code is received and it is DIFFERENT from the Home Country Code OR it is the same but the Strip Area Code is False;

<Subscriber Number received>;

If a TIE System Number is received the RETURN Address is composed as follows:

<Tie Trunk Access Code>: if defined; and

<Tie Number received>.

The process described hereinabove will be summarized with reference to FIG. 9 after describing how, in accordance with a preferred embodiment of the invention, AMIS addresses may be encoded to conserve memory and improve processing efficiency.

An AMIS address consists of the destination system AMIS telephone number and the destination party mailbox. In most cases, the complete address must be stored, for example, when delivering a message to the remote system or creating distribution lists ("DLISTS") with AMIS addresses.

The destination telephone number is encoded for storage. Standard encoding processes which require 4 bits per digit are used to store all the address digits except those representing access codes.

According to a preferred embodiment of the invention, where possible, Access Codes are compressed and stored as a single 3 bit code. This code, the Trunk Identifier, reflects the type of access code dialed based on the Access Codes defined in the Configuration Data. An illustrative compression/encoding scheme is as follows:

| Access Code Dialed | Trunk Identifier |
|---|---|
| External Trunk Access Code without International Access Code | 1 |
| External Trunk Access Code plus International Access Code | 2 |
| Tie Trunk Access Code | 3 |
| Undefined Access Code | 4 |
| Other Special Access Code | 5 |

In general, this type of compression/encoding scheme will reduce the storage requirements for AMIS destination telephone numbers. For example, typical dialing plans have a single digit external access code ('9') and an three digit international access code ('011'). This scheme reduces storage requirements from 16 bits (4 bits per digit) to 3 bits (to specify the appropriate Trunk Identifier).

Figure 11:
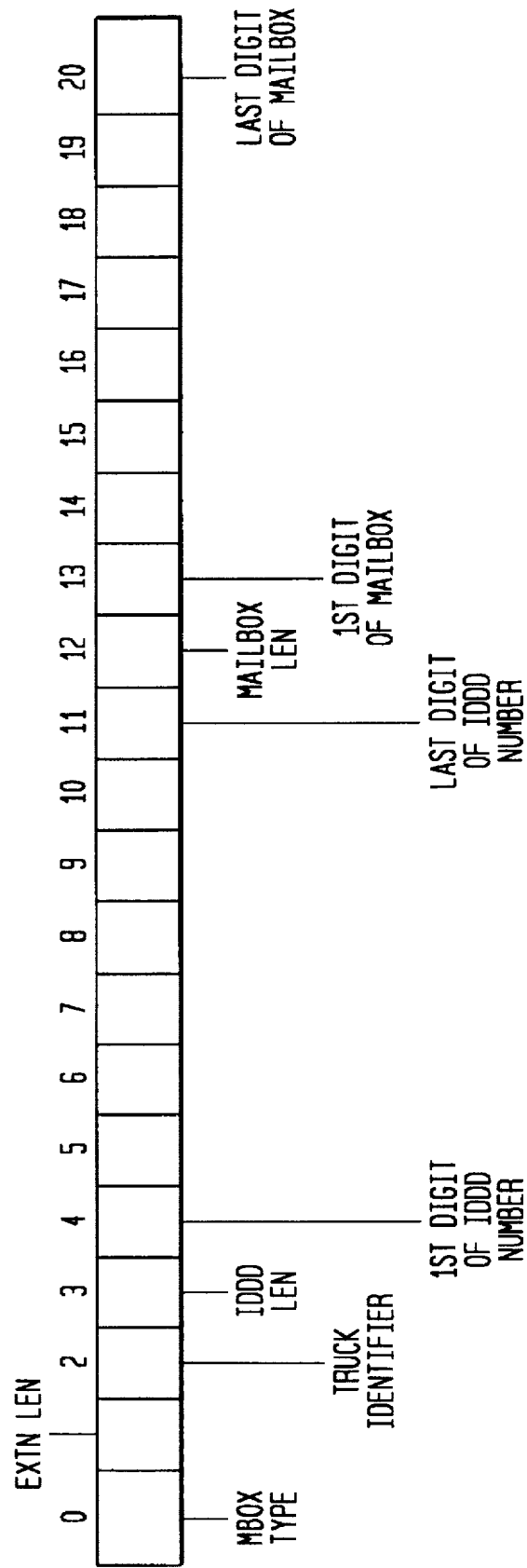
FIG. 11 depicts an example of how AMIS addresses are stored in a compressed/encoded form to support Distribution List processing.

In commercially available VM system networks, such as the PhoneMail network of voice store-and-forward messaging systems discussed hereinbefore, to support AMIS destination addresses in DLISTS, an AMIS address is stored as shown in FIG. 11, where:

(1) MBox Type is a unique number which identifies the type of destination address: for example, Local Extension, AMIS Extension.

(2) The Trunk Identifier is as described hereinabove.

(3) IDDD Len is the number of digits in the remaining portion of the destination telephone number. It is stored at byte 3 with a range of 1–15.

(4) The first digit of the destination telephone number (1st digit of IDDD Number) is stored in the upper nibble of type 4 of the entry; the last digit of a 15 digit destination telephone number is stored in the upper nibble of byte 11 of the entry.

(5) The Mailbox Len is the number of digits in the destination party mailbox. Its range is from 1–16 digits.

(6) The first digit of the (destination) mailbox is stored in the upper nibble of byte 13 and the last digit of a 16 digit mailbox is stored in the lower nibble of byte 20.

(7) The Extn Len is the maximum number of digits that can be accommodated in the data structure starting with the Trunk Identifier (1 digit).

In PhoneMail software which controls processing message delivery, a Message Record is maintained which includes the destination mailbox. In the PhoneMail implementation to support AMIS, this Message Record must contain the AMIS destination address. A similar format to the one described with reference to FIG. 11 (for AMIS DLIST address storage) is used for the Message Record.

This storage scheme described hereinabove not only saves storage space, but it allows for more efficient processing because:

(1) The MBox Type can be used to quickly distinguish AMIS messages from other types of messages; and (2) When the message is addressed the Trunk Identifier can be determined (selected) by referencing the Configuration Data. When that information is subsequently required, rather than repeatedly referencing the Configuration Data, the Trunk Identifier can be used.

Reference should now be made to FIG. 9 which depicts, in the form of a flow chart, an exemplary process for determining an Adjusted System Number at a Destination Site on a VM system network that supports the AMIS Analog Protocol, to facilitate (taking in account local dialing plans), replying to an AMIS message. This exemplary process includes the utilization of the encoding/compression scheme contemplated by the invention to conserve network storage requirements, as described hereinabove.

The exemplary process depicted in FIG. 9 takes protocol data as input and outputs the Adjusted System Number. The process begins by determining (at block 901), if the System Number sent by the originating (calling) Site and received at the Destination Site (via the protocol data), is a TIE Line number or PSTN number.

If the number received is a TIE number (leading digits ##0 as defined hereinbefore for AMIS), the called Site (Destination Site) determines (at block 902 of FIG. 9) whether a TIE Trunk Access code is defined locally. If yes, the RETURN Address (using the access code encoding scheme described hereinabove) is the TIE Trunk Identifier code (code "3" for "TIE Trunk Access", if the TIE Trunk Access code is defined; or code "4" ("Undefined") if the TIE Trunk Access Code is in fact not defined), plus the TIE Number received, extracted from the received System Number. The Return Address for a TIE line number is shown being constructed at blocks 903–905 of FIG. 9.

The Return Address is shown stored as the Adjusted System Number (for a TIE line number) at block 906. Using the Trunk Identifier compression/encoding scheme described hereinabove conserves memory. Those skilled in the art will recognize that the actual Adjusted System Number (i.e., the number required to reach the calling system) is of the form described hereinbefore, namely:

<TIE Trunk Access Code> if defined locally, plus
<TIE Number received>.

According to the exemplary process being described with reference to FIG. 9, if the System Number received at the Destination Site is not a TIE number; the Trunk Identifier code is marked as "External Trunk Access Code without International Access Code" (code "1" as defined hereinbefore), as shown at block 907 of FIG. 9.

Next, as part of the Adjusted System Number determination process, the Country Code is extracted from the System Number, as shown at block 908. The extracted Country Code (provided as part of the protocol data) is tested (at block 909) to see if it is the same as the Home Country code configured in the local (receiving system) data base.

If the Country codes do not match, the Trunk Identifier code is changed, as shown at block 910, to reflect "External Trunk Access Code with International Access Code" (code "2" as defined hereinbefore), and the received Country Code is copied to form a part of the Adjusted System Number (as shown at block 911).

Next, as shown at block 912, the "Trunk Code" is extracted from the System Number. It should be noted that the process step depicted at block 912 follows immediately after the test depicted at block 909 in the event that the Home Country code and received Country Code are the same (in this case the Trunk Identifier is still "1", and the received Country is not included as part of the Adjusted System Number).

Once the Trunk Code is extracted from the received System Number, it is tested (at block 913) to determine if it is greater than zero digits. I.e., it is tested to see if an area (trunk) code was furnished as part of the received System Number. In the event no trunk code is provided, the Subscriber Number is extracted from the System Number, as shown at block 920. The Subscriber Number is then appended to the Adjusted System Number being constructed (as shown at block 921), completing the Adjusted System Number determination process as shown at block 922.

However, in the event an area code is provided as part of the received System Number, the Trunk Identifier code is tested (at block 914) to determine if the code is set to "External Trunk Access Code with International Access Code" (code "2" as defined hereinbefore). If in fact the Trunk Identifier code is set to "External Trunk Access Code with International Access Code", the extracted Trunk Code (extracted at block 912 in FIG. 9), is appended to the Adjusted System Number being constructed, as shown at block 919. In this case, the Subscriber Number is then extracted from the received System Number (again at block 920), and is appended to the Adjusted System Number being constructed (as shown at block 921 of FIG. 9), completing the Adjusted System Number determination process when the tests at blocks 913 and 914 of FIG. 9 are positive.

In the event that the test at block 914 is negative, i.e., that the Trunk Identifier code is not set to "External Trunk Access Code with International Access Code"; then a test is made (as shown at block 915), to determine if the Trunk Code is the same as the Home Code as configured in the local (receiving) Site data base. If this test is negative (no match), a test is made (as indicated at block 917 of FIG. 9), to determine if a "1" is required before dialing out of area from the receiving Site. It should be recalled that this information is normally maintained in the local Site's data base as the previously defined "Dial 1 for Long Distance", True/False parameter.

If a "1" is required, as determined at block 917 of the illustrative process being described with reference to FIG. 9, then a "1" is appended to the Adjusted System Number being constructed, as indicated at block 918 of FIG. 9. In the case that a "1" is not required following the block 917 test; or alternatively, after a "1" has been appended to the Adjusted System Number as called for at block 918, the illustrative process calls for appending the Trunk Code to the Adjusted System Number being constructed, as indicated at block 919. Once again, the steps indicated at blocks 920 and 921 follow the step of appending the Trunk Code to the Adjusted System Number being constructed (as indicated at block 919), completing the Adjusted System Number determination process.

Finally, with respect to the exemplary process depicted in FIG. 9, if the Trunk Code is determined (at block 915) to be the same as the home area code configured in the local data base, a test is made (as shown at block 916), to determine if the Home Trunk Code is required for dialing local numbers. It should be recalled that a configured Strip Area Code Indicator (A True/False parameter which indicates whether or not the Home Trunk Code is required for dialing local numbers), provides the information needed to perform this test.

If the Strip Area Code Indicator parameter indicates that the Home Trunk Code is required for dialing local numbers, the illustrative flow chart depicted in FIG. 9 calls for the performance of the steps shown at blocks 917–919 as necessary. After these steps are performed; or alternatively, if the Home Trunk Code is not required for dialing local numbers (as determined at block 916), the illustrative process contemplated by the invention is completed by performing the steps shown at blocks 920 and 921.

The output of the illustrative process described with reference to FIG. 9 is data sufficient to "dial" the Adjusted System Number, i.e., information to return a message to the calling system.

Reference should now be made to FIG. 10 which illustrates, in the form of a flow chart, an exemplary process for converting an Adjusted System Number, constructed at a Destination Site, into an Enhanced Address if locally defined at the Destination Site. FIG. 10 is also a representation of a process for implementing steps 7 and 8 of the exemplary 8 step Enhanced Addressing process described hereinabove.

Block 1001 which is the start of the illustrative process contemplated by the invention, has already been described with reference to FIG. 9. This is effectively the input to the process depicted in FIG. 10 (the determined Adjusted System Number). The output of the process is a locally defined Enhanced Address whenever such address is in fact defined.

The next step of the illustrative process is to retrieve the Trunk Identifier code associated with the Adjusted System Number whenever the preferred compression/encoding scheme contemplated (but not required for Enhanced Addressing) by the invention is utilized. The retrieval of the Trunk Identifier code is indicated as taking place at process step 1002 shown in FIG. 10.

A test is then performed (as indicated at block 1003) to determine if locally there is an AASP defined with a Remote Site Address matching the Adjusted System Number. If there is no match (after checking all of the locally defined AASPs), then no Enhanced Address (corresponding to the Adjusted System Number) is defined at the receiving Site, as indicated at block 1004 of FIG. 10.

If there exists a locally defined AASP with a Remote Site Address matching the Adjusted System Number, the Access Code Type is extracted from the AASP as indicated in block 1005.

Next, the Access Code Type extracted is compared with the Trunk Identifier code to determine if there is a match. This is indicated by the process step shown at block 1006 in FIG. 10. Once again, if the test fails and there is no match, the search for a locally defined Enhanced Address corresponding to the Adjusted System Number fails.

If the test performed as indicated at block 1006 results in the determination of a match, the Site Profile defined locally is used to determine (as indicated at block 1007) the originating mailbox (now the destination mailbox from the receiving Site's perspective), digits and number of digits.

The remainder of the illustrative process depicted in FIG. 10 (once a matching Site Profile has been found), may be used to implement the (re)conversion process step described hereinbefore (referred to as step (8) of the illustrative Enhanced Addressing process).

In other words, once a a match is found, (re)conversion is possible and the Destination Site uses the originating mailbox received to build a local Enhanced Address from Extension Ranges associated with the matching profile.

A suitable (re) conversion process that may be used, in accordance with the teachings of the invention, by the receiving Site is as follows (with continued reference to FIG. 10):

(a) In the Site Profile with the matching Site Address consider only those Extension Ranges whose User Subaddress Length is the same as the originating mailbox length (see blocks 1008–1010 in FIG. 10).

(b) For potential Extension Range candidates strip the Network Prefix Digits as indicated at block 1011 of FIG. 10. An Extension Range is considered a match if all remaining Leading Digits are the same as the corresponding digits of the received User Subaddress (block 1012); otherwise the test at block 1010 is performed to determine if there are any other Extension Ranges to check.

(c) Prepend the Network Prefix Digits of the matching Extension Range to the received User Subaddress (as indicated at block 1013 of FIG. 10). This is the (re) converted Enhanced Address.

This completes the description of how Enhanced Addressing may be performed according to the teachings of the invention.

A final aspect of the present invention that needs to be described is the use of the Trunk Identifier codes, discussed hereinabove, to implement the automatic reflection of data base changes for pending calls feature mentioned hereinbefore.

The method by which Trunk Identifier codes makes it possible to automatically reflect data base changes to trunk access codes may be best understood by way of example.

Suppose that an AMIS message is addressed using the External Access Code and the Trunk Identifier is set to "1". Suppose also, that while pending delivery and before "dialing" the remote destination, the External Access Code is changed. A Trunk Identifier "1" means that the External Access Code should be used to access the destination system, and any (including new) code stored in Configuration Data, can be retrieved from the data set just before the call is actually placed.

More importantly, perhaps, is the impact on DLISTS. By using the Trunk Identifier code, rather than specific digits, changes to the Access Codes can automatically be reflected during processing.

In the process described hereinabove with reference to FIG. 10 (i.e., how to adjust the received System Number for local dialing plans), the Trunk Identifier is also shown used to encode Access Code information.

What has been described in detail hereinabove are methods and apparatus meeting all of the aforestated objectives. As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated. For example, although the invention has been defined in terms of methods and apparatus which support the AMIS Analog Protocol per se, those skilled in the art will readily appreciate that the teachings of the invention are applicable for supporting other protocols, whether or not presently defined, which transmit a System Number, an originating mailbox number and a destination mailbox number, as contemplated by the AMIS Analog Protocol.

It is, therefore, to be understood that the claims appended hereto are intended to cover all such modifications and variations which fall within the true scope and spirit of of the invention.

What is claimed is:

1. A method for performing enhanced addressing in a voice messaging system network that supports the Audio Messaging Interchange Specification (AMIS) Analog Protocol, comprising the steps of:

(a) defining locally, at an originating site, a set of enhanced addresses;

(b) inputting one of said defined enhanced addresses at said originating site on said voice messaging system network specifying a destination site on the network corresponding to the inputted enhanced address; and (c) converting the inputted enhanced address into a casual address for interfacing with the network and accessing the destination site and subscriber mailbox at the destination site.

2. The method as set forth in claim 1 further comprising the step of converting a system number, received by a local destination site in accordance with the AMIS Analog Protocol, into an enhanced address consistent with a site numbering plan defined locally at said local destination site.

3. The method as set forth in claim 1 wherein said step of defining a set of enhanced addresses is performed using a local addressing scheme which is independent of external network addresses and does not require a user to dial access codes.

4. The method for performing enhanced addressing in a voice messaging system network that supports the Audio Messaging Interchange Specification (AMIS) Analog Protocol, comprising the steps of:

(a) configuring an originating site data base to include network address information relating to the originating site and at least one site profile for each destination site and one extension range covering each subscriber mailbox at the destination site to be accessed from the originating site utilizing enhanced addressing;

(b) inputting an enhanced address defined in a site profile at the originating site, corresponding to a defined destination site on the network and mailbox at said destination site;

(c) addressing the destination site and mailbox corresponding to the inputted enhanced address by converting the inputted enhanced address into a casual address; and (d) delivering a voice message, inputted by a user at the originating site, to the destination site and subscriber mailbox at the destination site corresponding to the inputted enhanced address.

5. The method as set forth in claim 4 wherein said step of delivering a voice message further comprises the steps of defining and selecting, at the originating site, an AMIS Analog Protocol compatible system number.

6. The method as set forth in claim 5 wherein said step of delivering a voice message further comprises the step of transmitting the selected AMIS Analog Protocol compatible system number to the destination site as part of the Audio Messaging Interchange Specification (AMIS) Analog Protocol.

7. The method as set forth in claim 6 further comprising the steps of:

(e) receiving the voice message and system number, transmitted by the originating site, at a local destination site;

(f) adjusting the received system number to construct a network address compatible with local dialing constraints at said local destination site to facilitate sending a reply message to the originating site; and (g) placing the received message in a subscriber mailbox at said local destination site.

8. A method for performing enhanced addressing in a voice messaging system network that supports the Audio Messaging Interchange Specification (AMIS) Analog Protocol, comprising the steps of:

(a) configuring an originating site data base containing the network address of the originating site; and (b) identifying said network address as one of either a public system telephone network (PSTN) number or a private line number, thereby allowing the system to select a proper access code to be used in enhanced addressing.

9. A method for performing enhanced addressing in a voice messaging system network that supports the Audio Messaging Interchange Specification (AMIS) Analog Protocol, comprising the steps of:

(a) defining a site profile for each destination site to be accessible from an originating site utilizing enhanced addressing, wherein said site profile includes at least the following information:
- (a1) a remote site address identifying a remote destination site to be accessed, wherein the remote site address is defined by a network numbering plan;
- (a2) an access code identifying any special access code that needs to be included in addressing said destination site;
- (a3) access code type information for indicating whether said access code is associated with a public line number or a private line number; and
- (a4) a set of extension ranges for identifying users at the destination site to be accessed, wherein each defined extension range in said set uniquely enables users at said destination site to be distinguished from local originating site users and from users at any other destination sites included as part of the voice messaging network, and further wherein each specific member of an extension range is an enhanced address; and (b) converting a locally defined originating site enhanced address into a casual address for interfacing with the network and accessing the destination site and subscriber mailbox at the destination site.

10. The method as set forth in claim 9 wherein an enhanced address comprises a sequence of digits having a number of digits organized as leading digits which uniquely identify a specific remote site and user subaddress digits and wherein each extension range in said set of extension ranges includes at least the following information:

(i) a range length indicating the number of digits in an enhanced address associated with a given extension range;

(ii) the leading digits, at the beginning of an extension range, which uniquely identify the address as being associated with users at a specific remote destination site;

(iii) the number of leading digits associated with each extension range; and (iv) the number of digits in the user subaddress at the destination site that a given extension range is designed to address.

11. The method as set forth in claim 10 wherein said leading digits need to be unique only within a given originating system's local numbering plan and otherwise may be defined independently at each originating site.

12. The method as set forth in claim 9 wherein said remote site address is a Public System Telephone Network (PSTN) number which may be used to access a communication port of the remote destination site.

13. The method as set forth in claim 9 wherein said remote site address is a private line number which may be used to access a communication port of the remote destination site.

14. A method for converting an address of an originating site provided to a local destination site, on a voice messaging system network that supports the Audio Messaging Interface Specification (AMIS) Analog Protocol, from a casual address provided by said protocol, to an enhanced address defined at said local destination site, comprising the steps of:

(a) converting the originating site casual address provided as protocol data to said local destination site, to an adjusted system number;

(b) determining if a site profile is defined at said local destination site containing a site address/adjusted system number match; and (c) generating a local enhanced address defined in any such site profile whenever a site address in said profile matches said adjusted system number, using a site independent locally defined addressing scheme.

15. A method for defining an Audio Messaging Interface Specification (AMIS) Analog Protocol compatible system number in a voice messaging system network that supports the AMIS Analog Protocol, and whenever a network supports both public system telephone network (PSTN) and private line access, selecting at an originating site an appropriate system number to use, comprising the steps of:

(a) configuring a data base at the originating site, defining an address on said voice messaging system network corresponding to the originating site, including:
  - (a1) home country code, home trunk code and AMIS PSTN telephone number whenever use of the PSTN by the originating site is supported; and
  - (a2) a private line telephone number whenever use of a private line by the originating site is supported;

(b) determining when selecting the system number to send to a destination site, if the destination address dialed by the user is prefaced by a defined external access code, signifying the use of the PSTN;

(c) selecting as the system number, whenever the destination address dialed by the user is prefaced by a defined external access code, a PSTN system number including home country code, home trunk code and AMIS PSTN telephone number;

(d) determining, when selecting the system number to send to a destination site, if the destination address dialed by the user is prefaced by a defined private line trunk access code, signifying the use of a private line;

(e) selecting as the system number, whenever the destination address dialed by the user is prefaced by a defined private line access code, a private line system number that includes the private line telephone number and a prefix to the private line telephone number to identify the system number as a private line system number;

(f) determining in the event no access codes are defined, if the AMIS PSTN telephone number has been configured in step (a);

(g) selecting as the system number, whenever no access codes are defined and the AMIS PSTN Telephone Number has been configured in step (a), a PSTN System Number including home country code, home trunk code and AMIS PSTN Telephone Number; and (h) otherwise selecting as the system number a private line system number including the private line telephone number and a prefix to the private line telephone number to identify the system number as a private line system number.

16. A method for defining an Audio Messaging Interface Specification (AMIS) Analog Protocol compatible system number in a voice messaging system network that supports the AMIS Analog Protocol, and whenever a network supports both public system telephone network (PSTN) and private line access, selecting at an originating site an appropriate system number to use, comprising the steps of:

(a) configuring a data base at the originating site, defining an address on said voice messaging system network corresponding to the originating site, including:
  - (a1) home country code, home trunk code, and AMIS PSTN Telephone Number whenever use of the PSTN by the originating site is supported; and
  - (a2) a private line telephone number whenever use of a private line by the originating site is supported;

(b) determining, when selecting the system number to send to a destination site, if the destination address dialed by the user is prefaced by a defined external access code, signifying the use of the PSTN;

(c) selecting as the system number, whenever the destination address dialed by the user is prefaced by a defined external access code, a PSTN system number including home country code, home trunk code and AMIS PSTN telephone number;

(d) determining, when selecting the system number to send to a destination site, if the destination address dialed by the user is prefaced by a defined private line trunk access code, signifying the use of a private line;

(e) selecting as the system number, whenever the destination address dialed by the user is prefaced by a defined private line access code, a private line system number that includes the private line telephone number and a prefix to the private line telephone number to identify the system number as a private line system number;

(f) determining, in the event no access codes are defined, if the AMIS private line telephone number has been configured in step (a);

(g) selecting as the system number, whenever no access codes are defined and the private line telephone number has been configured in step (a), a private line system number including the private line telephone number and a prefix to the private line telephone number to identify the system number as a private line system number; and (h) otherwise selecting as the system number a PSTN system number including home country code, home trunk code and AMIS PSTN telephone number.

17. The method as set forth in claim 16 wherein a format of said PSTN system number, in support of the AMIS Analog Protocol, is: <home country code>#<home trunk code>#<AMIS PSTN telephone number>, where "#" is a dual tone multiple frequency (DTMF) pound tone used as a delimiter.

18. The method as set forth in claim 16 wherein a format of said private line system number, in support of the AMIS Analog Protocol, is: 0##<AMIS private line telephone number>, where "#" is a dual tone multiple frequency (DTMF) pound tone used as a delimiter and a prefix "0##" identifies a number to follow as an AMIS private line telephone number.

19. A method for adjusting a received system number at a local destination site, in support of local dialing plans, to facilitate replying to a message complying with an Audio Messaging Interface Specification (AMIS) Analog Protocol, comprising the steps of:

(a) determining whether the system number supplied by the AMIS Analog Protocol is a Public System Telephone Network (PSTN) system number or a private line system number; and (b) generating, as a function of whether the received system number is a PSTN system number or a private line system number, a return address that is compatible with local dialing patterns.

20. A method for compressing/encoding system number address information, and by extension Audio Messaging Interchange Specification (AMIS) destination address information, to conserve memory usage associated with storing dialed access codes and improve processing efficiency in voice messaging system networks supporting an AMIS Analog Protocol, comprising the steps of:

(a) defining compressed trunk identifier codes which reflect the type of access codes dialed; and (b) storing the compressed mink identifier codes in the system number, without storing the dialed access codes, thereby compressing the system number.

21. The method as set forth in claim 20 wherein said compressed trunk identifier codes comprise:

(i) a first compressed code for indicating an external trunk access code dialed without an international access code;

(ii) a second compressed code for indicating an external trunk access code dialed with an international access code; and (iii) a third compressed code for indicating a dialed private line trunk access code.

22. A method for automatically reflecting changes to a data base in response to changes to access codes for pending calls in a voice messaging system network that supports the Audio Messaging Interchange Specification (AMIS) Analog Protocol, comprising the steps of:

(a) utilizing trunk identifier compression codes for pending calls to select access codes defined in a site's configuration data base;

(b) modifying access code information stored in said data base prior to dialing a pending call, thereby updating said data base; and (c) retrieving access code configuration data corresponding to a given trunk identifier code for placing a pending call when dialing said call.

23. The method as set forth in claim 22 in which said step of utilizing trunk identifier compression codes to select access codes defined in a site's configuration data base is further utilized to automatically update distribution list (DLIST) AMIS addresses to reflect changes in access codes.

24. A method for performing enhanced addressing in a voice messaging system network that supports the Audio Messaging Interchange Specification (AMIS) Analog Protocol, comprising the steps of:

(a) defining, at each site in a network using enhanced addressing, a numbering plan that is independent of every other network site's numbering plan;

(b) utilizing locally defined data at an originating site to convert an enhanced address to a casual address and to extract information from an enhanced address to provide to the AMIS Analog Protocol;

(c) reconverting an address, at a destination site, specified in casual address format to enhanced address format by combining information supplied during the AMIS protocol exchange with locally supplied data to build a local enhanced address;

(d) utilizing the information furnished during the AMIS protocol exchange, together with locally defined data, to distinguish between Public System Telephone Network (PSTN and private line destinations; and (e) defining an addressing scheme which can be used to support both casual and enhanced addressing over the same system network.

25. A method for utilizing a voice messaging system network that supports the Audio Messaging Interchange Specification (AMIS) Analog Protocol to send a message between a first site and a second site on said network, comprising the steps of:

(a) defining and selecting an AMIS compatible system number at said first site, to be provided to said second site as part of protocol data; and (b) adjusting any system number received at said second site, as part of protocol data, to construct an adjusted system number that may be utilized at said second site to send a reply to said first site.

26. The method as set forth in claim 25 further comprising the steps of:
   (c) defining compressed trunk identifier codes which reflect the type of access codes dialed; and
   (d) storing the compressed trunk identifier codes instead of encoded dialed access codes.

27. The method as set forth in claim 26 further comprising the steps of:
   (e) modifying and storing access code information prior to dialing a pending call; and
   (f) retrieving access code configuration data corresponding to a given trunk identifier code for placing a pending call when dialing said call.

28. A method for performing enhanced addressing in a voice messaging system network comprising the steps of:
   (a) defining locally, at an originating site, a set of enhanced addresses;
   (b) inputting, by a first subscriber at an originating site, one of said defined enhanced addresses at said originating site on said voice messaging system network specifying a destination site on the network corresponding to the inputted enhanced address; and
   (c) converting the inputted enhanced address into a casual address for interfacing with the network and accessing the destination site and a mailbox of a second subscriber at the destination site.

29. The method as set forth in claim 28 wherein said voice messaging system network supports a communication protocol which provides to said destination site a telephone number of the originating site, a number of a mailbox of the first subscriber at the originating site, and the number of the mailbox of the second subscriber at the destination site.

30. The method as set forth in claim 29 further comprising the step of converting said information provided to said destination site, by said communication protocol, into an enhanced address consistent with a site numbering plan defined at said destination site.

* * * * *